United States Patent
Arima et al.

(10) Patent No.: US 7,849,304 B2
(45) Date of Patent: Dec. 7, 2010

(54) SYSTEM AND METHOD FOR ON-LINE DIAGNOSTICS

(75) Inventors: Juntaro Arima, Hitachinaka (JP); Takashi Iizumi, Hitachinaka (JP); Masaaki Inaba, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 576 days.

(21) Appl. No.: 11/812,496

(22) Filed: Jun. 19, 2007

(65) Prior Publication Data

US 2008/0005554 A1 Jan. 3, 2008

Related U.S. Application Data

(63) Continuation of application No. 10/443,015, filed on May 22, 2003, now Pat. No. 7,373,501.

(30) Foreign Application Priority Data

May 29, 2002 (JP) ............................. 2002-154895

(51) Int. Cl.
| | |
|---|---|
| H04L 29/06 | (2006.01) |
| H04L 9/00 | (2006.01) |
| G05B 19/18 | (2006.01) |
| G05B 23/02 | (2006.01) |
| G09G 5/00 | (2006.01) |
| H04J 1/16 | (2006.01) |

(52) U.S. Cl. .......................... 713/150; 380/259; 700/65
(58) Field of Classification Search ................. 713/150; 380/259; 700/65
See application file for complete search history.

(56) References Cited

U.S. PATENT DOCUMENTS 6,901,306 B2 5/2005 Nakamoto et al.

(Continued)

FOREIGN PATENT DOCUMENTS

EP 0 822 473 A2 2/1998

(Continued)

OTHER PUBLICATIONS

G. Rouvroy, F.-X. Standaert, F. Lefèbvre, J.-J. Quisquater, B. Macq, J.-D. Legat; "Reconfigurable hardware solutions for the digital rights management of digital cinema"; Oct. 2004; DRM '04: Proceedings of the 4th ACM workshop on Digital rights management; Publisher: ACM; pp. 40-53.*

(Continued)

*Primary Examiner*—Michael Pyzocha
*Assistant Examiner*—Courtney D Fields
(74) *Attorney, Agent, or Firm*—Dickstein Shapiro LLP

(57) ABSTRACT

An on-line diagnostic system and method enable equipment information stored in each piece of industrial equipment to be safely disclosed to maintenance personnel to the extent permitted by the user of the industrial equipment. The on-line diagnostics systems comprises industrial equipment and a maintenance apparatus for the maintenance of the industrial equipment, which are connected via the Internet. Equipment information indicating the state of the industrial equipment is encrypted using a specific common key, and the encrypted equipment information is transmitted to the maintenance apparatus in response to a request therefrom. The fact that the common key has been transmitted from the industrial equipment to the maintenance apparatus is outputted. After receiving the encrypted equipment information and the common key that have been transmitted, the encrypted equipment formation is decrypted using the common key, and the decrypted equipment information is outputted.

66 Claims, 19 Drawing Sheets

U.S. PATENT DOCUMENTS

| | | |
|---|---|---|
| 7,373,501 B2 | 5/2008 | Arima et al. |
| 2002/0024644 A1 | 2/2002 | Ina et al. |
| 2002/0029086 A1* | 3/2002 | Ogushi et al. .................. 700/65 |
| 2003/0032421 A1 | 2/2003 | Izumi et al. |
| 2003/0070067 A1* | 4/2003 | Saito ........................... 713/150 |
| 2008/0133032 A1 | 6/2008 | Arima et al. |

FOREIGN PATENT DOCUMENTS

| | | |
|---|---|---|
| EP | 1 089 493 A2 | 4/2001 |
| JP | 57-137933 A | 8/1982 |
| JP | 2-240710 A | 9/1990 |
| JP | 7-303104 A | 11/1995 |
| JP | 9-069057 A | 3/1997 |
| JP | 11-015520 A | 1/1999 |
| JP | 2002-057101 A | 2/2002 |
| WO | WO 02/21280 A1 | 3/2002 |
| WO | WO 03024007 A1 * | 3/2003 |

OTHER PUBLICATIONS

Neng-Chung Wang, Shian-Zhang Fang, Yung-Fa Huang; "Mobile Computing Symposium: Security and Applications in Mobile Computing: Hierarchy-based management for secure group communications in mobile ad hoc networks"; Aug. 2007, pp. 571-576.

* cited by examiner

FIG.4

150 — COMMON-KEY MANAGING TABLE

| EQUIPMENT DATA ID (151) | COMMON KEY (152) | COMMON-KEY DISCLOSURE CONDITION (153) |
|---|---|---|
| D 1 | A B C ... | TO BE DISCLOSED ONLY TO UPPER-LEVEL MAINTENANCE PERSONNEL |
| D 2 | C B A ... | TO BE DISCLOSED ONLY TO UPPER- AND INTERMEDIATE-LEVEL MAINTENANCE PERSONNEL |
| ... | ... | ... |

FIG.5

160 — MAINTENANCE PERSONNEL ATTRIBUTE-MANAGING TABLE

| MAINTENANCE PERSONNEL ID (161) | MAINTENANCE PERSONNEL PASSWORD (162) | MAINTENANCE PERSONNEL TYPE (163) |
|---|---|---|
| A 1 | 1 2 3 4 | UPPER-LEVEL MAINTENANCE PERSONNEL |
| A 2 | 5 6 7 8 | INTERMEDIATE-LEVEL MAINTENANCE PERSONNEL |
| ... | ... | ... |

FIG.6

ANALYSIS STATE-MANAGING TABLE

| ANALYSIS WORK ID | EQUIPMENT DATA ID | RECORDED DATE | MAINTENANCE PERSONNEL TYPE | MAINTENANCE PERSONNEL ID | CONTENT |
|---|---|---|---|---|---|
| ... | ... | ... | ... | ... | ... |
| 101 | D 1 | 2001:01:03 :11:10:00 | UPPER-LEVEL MAINTENANCE PERSONNEL | A 1 | ACQUISITION OF COMMON KEY |
| 101 | D 1 | 2001:01:03 :11:10:30 | UPPER-LEVEL MAINTENANCE PERSONNEL | A 1 | DECRYPTION OF DATA |
| 101 | D 1 | 2001:01:03 :11:11:00 | UPPER-LEVEL MAINTENANCE PERSONNEL | A 1 | ANIMATION-DISPLAY OF THE TRANSPORT SYSTEM |
| 101 | D 1 | 2001:01:03 :11:11:30 | UPPER-LEVEL MAINTENANCE PERSONNEL | A 1 | ANIMATION-DISPLAY OF THE EXHAUST SYSTEM |
| 101 | D 1 | 2001:01:03 :11:12:00 | UPPER-LEVEL MAINTENANCE PERSONNEL | A 1 | ANIMATION-DISPLAY OF THE OPTICAL SYSTEM |
| 101 | D 1 | 2001:01:03 :11:12:30 | UPPER-LEVEL MAINTENANCE PERSONNEL | A 1 | TIMING-CHART DISPLAY OF THE OPTICAL SYSTEM |
| 101 | D 1 | 2001:01:03 :11:13:00 | UPPER-LEVEL MAINTENANCE PERSONNEL | A 1 | OVERLAY DISPLAY |
| 101 | D 1 | 2001:01:03 :11:13:30 | UPPER-LEVEL MAINTENANCE PERSONNEL | A 1 | IDENTIFICATION OF CAUSE |
| 101 | D 1 | 2001:01:03 :11:14:00 | UPPER-LEVEL MAINTENANCE PERSONNEL | A 1 | DELETION OF DATA |
| 101 | D 1 | 2001:01:03 :11:14:30 | UPPER-LEVEL MAINTENANCE PERSONNEL | A 1 | DELETION OF COMMON KEY |
| ... | ... | ... | ... | ... | ... |

FIG.7

PROGRAM MANAGING TABLE

| PROGRAM ID | PROGRAM TYPE | DESIGNATION | PROCESS CONDITION | PROCEDURE |
|---|---|---|---|---|
| P 1 | READING PROGRAM | READING OF PROGRAM | — | (1) READING OF PROGRAM |
| P 2 | READING PROGRAM | READING OF PROGRAM EXECUTION HISTORY | — | (1) READING OF PROGRAM EXECUTION HISTORY |
| P 3 | READING PROGRAM | READING OF SENSOR-STATE HISTORY | — | (1) READING OF SENSOR-STATE HISTORY |
| P 4 | READING PROGRAM | READING OF PROCESSING RESULT | — | (1) READING OF PROCESSING RESULT |
| P 5 | SOLVING PROGRAM | GENERATION OF PROGRAM | — | (1) CREATING OF PROGRAM |
| P 6 | SOLVING PROGRAM | EDITING OF PROGRAM | — | (1) EDITING OF PROGRAM |
| P 7 | SOLVING PROGRAM | DELETION OF PROGRAM | — | (1) DELETING OF PROGRAM |
| P 8 | SOLVING PROGRAM | AUTOMATIC WAFER PROCESSING | OPERATION MODE: AUTO SLOT NUMBER: 1 UNIT OF PROCESSING: WAFER MEASURED IMAGE: IMAGE 1 | (1) LOADING OF WAFER (2) ALIGNING OF WAFER (3) ADDRESSING (4) MEASUREMENT (5) UNLOADING OF WAFER |
| P 9 | SOLVING PROGRAM | MANUAL WAFER PROCESSING | OPERATION MODE: MANUAL SLOT NUMBER: 2 UNIT OF PROCESSING: CASSETTE MEASURED IMAGE: IMAGE 2 | (1) LOADING OF WAFER (2) ALIGNING OF WAFER (3) ADDRESSING (4) MEASUREMENT (5) UNLOADING OF WAFER |
| ... | ... | ... | ... | ... |

FIG.8

PROGRAM EXECUTION HISTORY-MANAGING TABLE

| EXECUTION DATE | USER ID | PROGRAM ID | PARAMETERS |
|---|---|---|---|
| 2001:01:02:10:10:10 | U 1 | P 8 | — |
| 2001:01:02:10:15:10 | U 1 | P 9 | — |
| ... | ... | ... | ... |

SENSOR-STATE HISTORY MANAGING TABLE

| RECORDED DATE | SENSOR S1 | SENSOR S2 |
|---|---|---|
| 2001:01:02:10:10:1 | 0.01 | 0.10 |
| 2001:01:02:10:10:1 | 0.02 | 0.20 |
| ... | ... | ... |

PROCESSING-RESULT MANAGING TABLE

| WAFER ID | WAFER IMAGE |
|---|---|
| W 1 | |
| W 2 | |
| ... | ... |

FIG.9

| APPARATUS ID | ERROR CODE | EQUIPMENT DATA PACKAGE | ANALYSIS RESULT |
|---|---|---|---|
| T 1 | E 0 1 2 3 | P 1 | R 1 |
| T 1 | E 0 1 2 4 | P 2 | R 2 |
| ... | ... | ... | ... |

KNOWLEDGE MANAGING TABLE

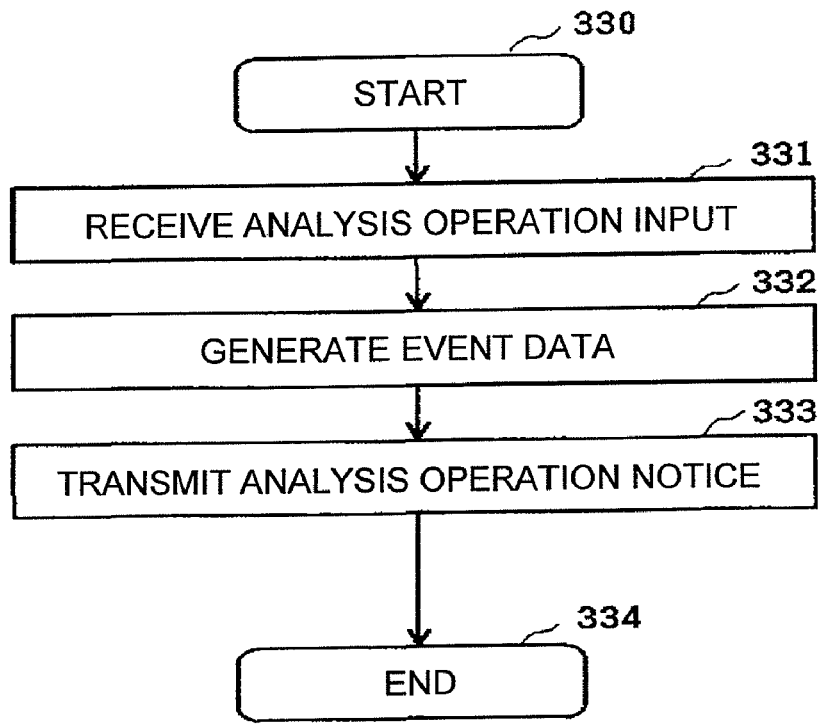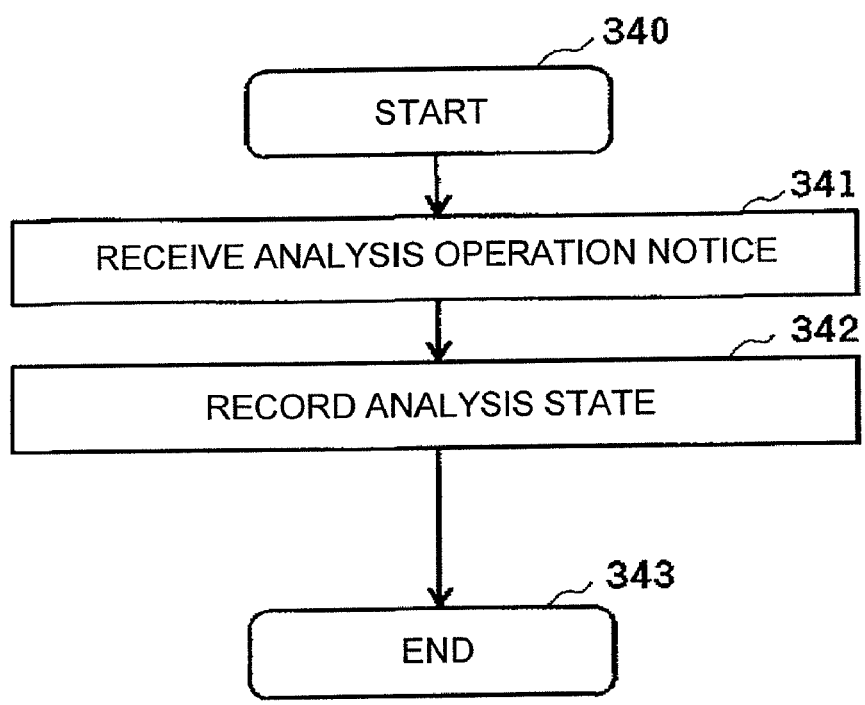

FIG.18

ANALYSIS STATE OUTPUT WINDOW 390

ANALYSIS STATE:

| ANALYSIS WORK ID | EQUIPMENT DATA ID | RECORDED DATE | MAINTENANCE PERSONNEL TYPE | MAINTENANCE PERSONNEL ID | CONTENT |
|---|---|---|---|---|---|
| ... | ... | ... | ... | ... | ... |
| 101 | D1 | 2001:01:03 :11:10:00 | UPPER-LEVEL MAINTENANCE PERSONNEL | A1 | ACQUISITION OF COMMON KEY |
| 101 | D1 | 2001:01:03 :11:10:00 | UPPER-LEVEL MAINTENANCE PERSONNEL | A1 | DECRYPTION OF DATA |
| 101 | D1 | 2001:01:03 :11:10:00 | UPPER-LEVEL MAINTENANCE PERSONNEL | A1 | ANIMATION DISPLAY |
| 101 | D1 | 2001:01:03 :11:10:00 | UPPER-LEVEL MAINTENANCE PERSONNEL | A1 | TIMING-CHART DISPLAY |
| 101 | D1 | 2001:01:03 :11:10:00 | UPPER-LEVEL MAINTENANCE PERSONNEL | A1 | OVERLAY DISPLAY |
| 101 | D1 | 2001:01:03 :11:10:00 | UPPER-LEVEL MAINTENANCE PERSONNEL | A1 | IDENTIFICATION OF CAUSE (IT WAS DETERMINED THAT ...) |
| 101 | D1 | 2001:01:03 :11:10:00 | UPPER-LEVEL MAINTENANCE PERSONNEL | A1 | DELETION OF DATA |
| 101 | D1 | 2001:01:03 :11:10:00 | UPPER-LEVEL MAINTENANCE PERSONNEL | A1 | DELETION OF COMMON KEY |
| ... | ... | ... | ... | ... | ... |

MAINTENANCE REQUEST

ANALYSIS STATE MANAGING TABLE

| ANALYSIS WORK ID | EQUIPMENT DATA ID | RECORDED DATE | MAINTENANCE PERSONNEL TYPE | MANTENANCE PERSONNEL ID | CONTENT | AMOUNT |
|---|---|---|---|---|---|---|
| ... | ... | ... | ... | ... | ... | ... |

SYSTEM AND METHOD FOR ON-LINE DIAGNOSTICS

CROSS-REFERENCE TO RELATED APPLICATIONS

This is a continuation of U.S. patent application Ser. No. 10/443,015, filed May 22, 2003, claiming priority on Japanese Patent Application No. 2002-154895, filed on May 29, 2002, the entirety of which are incorporated herein by reference.

BACKGROUND OF THE INVENTION

1. Technical Field

The present invention relates to a system and method for on-line diagnostics of industrial equipment.

2. Background Art

Industrial equipment, such as manufacturing apparatus, inspection apparatus, and analysis apparatus, is delivered to clients via industrial-equipment suppliers (to be hereafter referred to as equipment supplier/vendors) after it is manufactured by manufactures. Maintenance of such equipment after delivery is indispensable in order to maintain its performance.

Conventionally, industrial equipment, such as those mentioned above, is connected to a maintenance center of an equipment supplier/vendor via the Internet, so that the industrial equipment can be maintained remotely from the maintenance center. JP Patent Publication (Kokai) No. 11-15520 A (1999) proposes an on-line diagnostics system using the Internet. The system allows industrial equipment to be maintained no matter where it is located.

Items of industrial equipment with a built-in computer can store equipment information about the history of their use on an individual item basis. Such equipment information is very valuable from the viewpoint of maintenance, for it can be used in determining the cause of troubles. For instance, if one can refer to equipment information that indicates what kind of program was run and when it was run, how the state of each part of the industrial equipment transitioned, and what processing results were obtained, one can expect to be able to determine whether the cause of a trouble is in the contents of the program, in the sequence of execution of the program, or in a particular location of an apparatus, or whether the processing results are desirable.

However, equipment information has rarely been disclosed to maintenance personnel at the maintenance center via the Internet, which a third party can readily access, because in many cases equipment information includes confidential information about the manufacturing plan of products manufactured by the industrial equipment or the products' specifications. As a result, it has been often difficult to cope with troubles quickly.

Accordingly, how to manage equipment information safely and utilize it for maintenance in Internet-based on-line diagnostics systems has been an important issue. However, the on-line diagnostics system disclosed in above-mentioned JP Patent Publication (Kokai) No. 11-15520 does not address the question of how to utilize equipment information in an active manner.

SUMMARY OF THE INVENTION

It is an object of the invention to provide an on-line diagnostics system and method whereby equipment information stored in each item of industrial equipment can be disclosed to maintenance personnel safely to the extent permitted by the user of the industrial equipment.

In one aspect, the invention provides an on-line diagnostics method for industrial equipment to which a maintenance apparatus is connected for the maintenance thereof via the Internet, the method comprising the steps of:

encrypting equipment information indicating the state of the industrial equipment using a specific common key;

transmitting the encrypted equipment information to the maintenance apparatus in response to a request therefrom;

outputting the fact that the common key has been transmitted from the industrial equipment to the maintenance apparatus;

receiving the encrypted equipment information and the common key that have been transmitted;

decrypting the encrypted equipment information using the common key; and outputting the decrypted equipment information.

In another aspect, the invention provides an on-line diagnostics system comprising industrial equipment and a maintenance apparatus for the maintenance of the industrial equipment, which are connected via the Internet, wherein the industrial equipment comprises an encryption unit, a communication unit, and an input/output unit, wherein the encryption unit encrypts equipment information indicating the state of the industrial equipment using a specific common key, the communication unit transmits the encrypted equipment information encrypted by the encryption unit to the maintenance apparatus in response to a request therefrom, and the input/output unit outputs the fact that the common key has been transmitted from the industrial equipment to the maintenance apparatus, and wherein the maintenance apparatus comprises a communication unit, a decryption unit, and an input/output unit, wherein the communication unit receives the encrypted equipment information and the common key that have been transmitted from the communication unit of the industrial equipment, the decryption unit decrypts the encrypted equipment information using the common key, and the input/output unit outputs the equipment information decrypted by the decryption unit.

Preferably, a countervalue for the contents of maintenance carried out by a maintenance apparatus on industrial equipment based on equipment information is calculated and transmitted

BRIEF DESCRIPTION OF THE DRAWINGS

FIG. 4 shows the structure of a common-key managing table.

FIG. 5 shows the structure of a maintenance personnel attribute managing table.

FIG. 6 shows the structure of an analysis-state managing table.

FIG. 7 shows the structure of a program execution-history managing table.

FIG. 8 shows the structure of an execution authority managing table, a program execution-history managing table, and a sensor-state history managing table.

FIG. 9 shows the structure of a knowledge managing table.

FIG. 13 shows a flowchart of the operation of the maintenance apparatus when transmitting an analysis operation notice.

FIG. 14 shows a flowchart of the operation of a communication unit of semiconductor manufacture/semiconductor manufacture/inspection equipment when receiving the analysis operation notice.

FIG. 18 shows an analysis result output window displayed on the semiconductor manufacture/inspection equipment.

DESCRIPTION OF THE INVENTION

A first embodiment of the invention will be hereafter described. The embodiment is an on-line diagnostics system for semiconductor manufacture/inspection equipment. The system allows equipment information stored in each item of industrial equipment to be disclosed to maintenance personnel safely to the extent permitted by the user of the industrial equipment. The industrial equipment to which the invention can be applied is not particularly limited as long as it has a computer built inside. In the following description of the embodiment, however, the term industrial equipment refers to various apparatus and systems used in semiconductor manufacture, such as, for example, optical aligners, coaters, thermal oxidation furnaces, assembling apparatus, and inspection apparatus. These apparatus and systems will be hereafter generally referred to as semiconductor manufacture/inspection equipment. The equipment information that can be handled by the invention is not particularly limited, as long as it refers to data that indicates the state of industrial equipment. However, in the description of the embodiment, the term equipment information refers to programs, program execution history, sensor-state history, and wafer processing results. In the following, data concerning these items of information will be generally referred to as equipment data.

Figure 1:
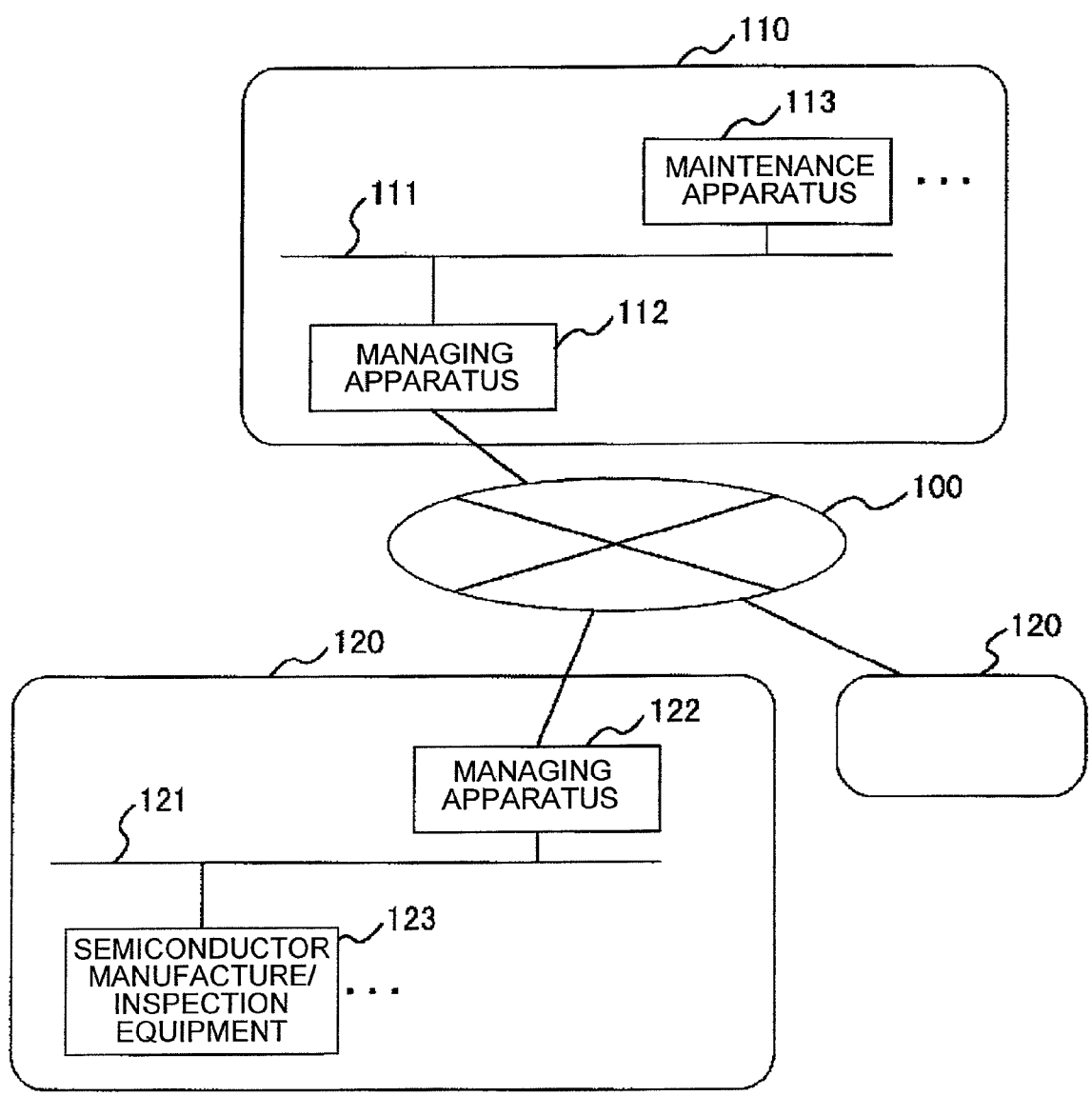
FIG. 1 shows a block diagram of a system according to a first embodiment of the invention.

FIG. 1 shows a block diagram of an example of the on-line diagnostics system for semiconductor manufacture/inspection equipment according to the invention. Numeral 110 designates a maintenance center belonging to a semiconductor manufacture/inspection equipment supplier ("equipment supplier/vendor"). Numeral 120 designates a manufacturing factory belonging to a semiconductor device manufacturer ("semiconductor manufacturer") that employs the semiconductor manufacture/inspection equipment. While FIG. 1 shows two manufacturing factories 120, there may be in practice more than two manufacturing factories 120. The manufacturing factories 120 may belong to different semiconductor manufacturers or to a single semiconductor manufacturer.

The maintenance center 110 includes one or more maintenance apparatus 113 for the maintenance of the semiconductor manufacture/inspection equipment, and a managing apparatus 112 for managing communication with the maintenance center 110. Each maintenance apparatus 113 and the managing apparatus 112 are connected via an intranet 111.

The maintenance center 110 includes one or more pieces of semiconductor manufacture/inspection equipment 123 for manufacturing semiconductor devices, and a managing apparatus 122 for managing communication with the manufacturing factory 120. Each piece of the semiconductor manufacture/inspection equipment 123 and the managing apparatus 122 are connected via an intranet 121. The managing apparatus 112 provided in the maintenance center 110 is connected via the Internet 100 to the managing apparatus 122 provided in each manufacturing factory 120.

While in the example of FIG. 1 each apparatus employs a computer, a single apparatus may be comprised of a plurality of computers, or, alternatively, a plurality of apparatus may be comprised of a single computer. Each of these computers includes a central processing unit ("CPU"), a main memory unit ("memory"), an auxiliary memory unit comprised of a fixed memory medium, such as a hard disc, another auxiliary memory unit comprised of a portable memory medium, such as a compact disc or a magneto-optical disc, an input unit such as a keyboard or a mouse, and an output unit such as a display unit.

A maintenance worker at the maintenance center 110 remotely carries out the maintenance of the semiconductor manufacture/inspection equipment 123 using the maintenance apparatus 113 at the maintenance center 110. Upon reception of a message ("maintenance request") requesting maintenance from the semiconductor manufacture/inspection equipment 123 where a trouble took place, the maintenance apparatus 113 outputs the data stored in the maintenance request to the output unit.

The data stored in a maintenance request includes an equipment ID identifying the semiconductor manufacture/inspection equipment, and an error code indicating the nature of the trouble. The data received by the output unit is utilized by the maintenance worker in determining whether or not the trouble must be dealt with online. Examples of data that may be stored in a maintenance request include the date of occurrence of trouble, data identifying the semiconductor manufacturing factory, and data indicating the type of the semiconductor manufacture/inspection equipment.

The maintenance apparatus 113 also has the function of transmitting a message ("maintenance operation") in which a program ID identifying a program and parameters to be given to the program are stored to the semiconductor manufacture/inspection equipment 123 from which a maintenance request has been received. There are two kinds of maintenance operation, namely a reading operation and a solving operation. In a reading operation, the program ID identifies a program for reading equipment data. In a solving operation, the program ID identifies a program for generating, editing, or deleting programs carried in the semiconductor manufacture/inspection equipment, a program for generating, editing, or deleting management data, or a program for testing the operation of the semiconductor manufacture/inspection equipment. In the following description, programs for reading equipment data are referred to as reading programs and other programs are referred to as solving programs.

Upon reception of a message ("maintenance operation response") transmitted from the semiconductor manufacture/inspection equipment 123 in response to the maintenance operation, the maintenance apparatus 113 stores the data stored in the maintenance operation response in a file in the external memory unit designated by maintenance personnel. The maintenance apparatus 113 then notifies the output unit of the fact that the data has been stored in the file. There are two kinds of maintenance operation response, namely a reading operation response and a solving operation response.

The reading operation response is a response to a reading operation and it stores an equipment data package. The equipment data package is comprised of an equipment data ID, encrypted equipment data, and event transmission rules. The event transmission rules may be encrypted using a common key that is used in encrypting equipment data. The solving operation response is a response to a solving operation and it stores message data. The message data is output by a solving program.

The maintenance apparatus 113 also has the function of transmitting a message ("analysis start notice") in which a maintenance personnel ID identifying a maintenance worker, a maintenance personnel password, and the equipment data ID that exists in the equipment data package as the object of analysis are stored, to the semiconductor manufacture/inspection equipment 123 from which the maintenance request has been received. The encrypted equipment package as the object of analysis may be stored in a file in the external memory unit via a portable memory medium.

Upon reception of a message ("analysis start notice response") transmitted from the semiconductor manufacture/inspection equipment 123 in response to the analysis start notice, the maintenance apparatus 113 stores the common key stored in the analysis start notice response in the main memory unit. The stored common key is used by the maintenance worker in decrypting the equipment data identified by the equipment data ID stored in the analysis start notice. The maintenance apparatus 113 also stores rules limiting the operation on the common key stored the main memory unit, and limits the operation on the common key stored the main memory unit according to the stored rules. The operation on the stored common key includes copying within the main memory unit and copying from the main memory unit to the external memory unit, for example.

The maintenance apparatus 113 then decrypts the encrypted equipment data using the common key that was stored upon reception of the analysis start notice response. The maintenance apparatus 113 stores the decrypted equipment data in the main memory unit. The decrypted equipment data is used by the maintenance worker during analysis for determining whether the cause of trouble exists in the contents of a program, in the sequence of execution of the program, in communications in the control unit, or in a particular part of the apparatus, or whether the result of processing is desirable.

The maintenance apparatus 113 stores rules limiting operation on the equipment data stored in the main memory unit, and limits operation on the equipment data stored in the main memory unit according to the stored rules. The operation on the stored equipment data includes copying within the main memory unit and copying from the main memory unit to the external memory unit, for example.

The maintenance apparatus 113 generates event data indicating the history of operations on the decrypted equipment data carried out by the maintenance worker. The maintenance apparatus 113 then transmits a message ("analysis operation notice") in which the thus generated event data is stored to the semiconductor manufacture/inspection equipment 123 that transmitted the maintenance request, in accordance with the event transmission rules in the equipment data package that is the object of analysis. The event data is used by the user of the semiconductor manufacture/inspection equipment 123 in determining what kind of operation was carried out on the equipment data, when it was carried out, and by which maintenance worker it was carried out.

The maintenance apparatus 113 can output the decrypted equipment data to the output unit in the form of animation ("animation display"). The displayed animation is used by the maintenance worker in visually analyzing the operation of the semiconductor manufacture/inspection equipment 123, which cannot be seen with the naked eyes.

The maintenance apparatus 113 can also output the decrypted equipment data to the output unit using a timing chart ("timing chart display"). The displayed timing chart is used by the maintenance worker in analyzing the operation of the semiconductor manufacture/inspection equipment 123, which cannot be seen with the naked eyes, from the viewpoint of operation timings.

The maintenance apparatus 113 can also output the decrypted equipment data and other equipment data that had been recorded in advance to the output unit such that the different types of data are overlaid on a timing chart ("overlaid display"). The displayed timing chart is used by the maintenance worker during analysis involving the comparison of the operations of a plurality of items of industrial equipment or the comparison of the operation of a single piece of industrial equipment at different times.

The maintenance apparatus 113 can also be fed with grounds based on which the cause of a trouble has been identified. The grounds that are fed are used by the user of the semiconductor manufacture/inspection equipment or the maintenance worker in confirming the validity of the analysis work.

The maintenance apparatus 113 deletes the equipment data and the common key from the main memory unit in accordance with an operation carried out by the maintenance worker, and then transmits a message ("analysis completion notice") to the semiconductor manufacture/inspection equipment 123 from which the maintenance request has been received, the message storing data indicating the deletion of these data. The analysis completion notice is used by the user of the semiconductor manufacture/inspection equipment 123 in confirming that the decrypted equipment data and the distributed common key have been deleted in the maintenance apparatus 113 for sure. In the present embodiment, a single analysis work starts with the transmission of an analysis start notice and ends with the transmission of an analysis completion notice. The analysis work is repeated by the maintenance worker until the cause of trouble is identified.

The maintenance apparatus 113 also has the function of transmitting a message ("registration operation") to the managing apparatus 112 provided at the maintenance center 110.

A registration operation includes the equipment ID of the semiconductor manufacture/inspection equipment 123 for which maintenance work has been completed, the error code of the trouble, the encrypted equipment package used in identifying the cause of the trouble, and the history ("maintenance results") of analysis of the cause of the trouble.

The maintenance apparatus 113 is also capable of transmitting a message ("retrieval operation") in which the equipment ID and/or the error code is stored to the managing apparatus 112 provided at the maintenance center 110. The maintenance apparatus 113, upon reception of a message ("retrieval operation response") that is transmitted from the managing apparatus 112 in response to a retrieval operation, outputs the data stored in the retrieval operation response to the output unit. The output data is used by the maintenance worker in determining, with regard to the semiconductor manufacture/inspection equipment 123 from which the maintenance request has been received, whether or not the trouble must be dealt with online, the same trouble has occurred in the past, and how the trouble has been dealt with, for example. The manner in which the encrypted equipment data stored in the retrieval operation response is displayed is the same as in the case of displaying the encrypted equipment data read from the semiconductor manufacture/inspection equipment 123, and is therefore not described herein.

The managing apparatus 112 provided at the maintenance center 110 manages communications to and from the maintenance center 110 and the knowledge about maintenance. The managing apparatus 112 periodically monitors to determine whether or not a maintenance request has been received from the managing apparatus 122 provided at each manufacturing factory 120. Upon detection of the reception of a maintenance request, the managing apparatus 112 transmits the maintenance request to the managing apparatus 112 used by a particular maintenance worker according to predetermined rules.

The managing apparatus 112 also has the function of transmitting the messages of maintenance operation, analysis start notice, analysis operation notice, and analysis completion notice transmitted from the maintenance apparatus 113 in response to the maintenance request to the managing apparatus 122 at the manufacturing factory 120 that transmitted the maintenance request. The managing apparatus 112, upon reception of a registration operation transmitted from the maintenance apparatus 113, registers the equipment ID, error code, equipment data package, and analysis results that are stored in the registration operation, in a knowledge managing table in a mutually related manner. The managing apparatus 112, upon reception of the retrieval operation transmitted from the maintenance apparatus 113, searches the knowledge managing table using as a key the data stored in the retrieval operation, and transmits a retrieval operation response in which retrieved data is stored to the maintenance apparatus 113 that transmitted the retrieval operation.

The managing apparatus 112 can calculate a countervalue on the basis of the messages of maintenance operation, analysis start notice, analysis operation notice, and analysis completion notice transmitted from the maintenance apparatus 113. The managing apparatus 112, upon reception of a registration operation transmitted from the maintenance apparatus 113, registers the results of calculation in the knowledge managing table in association with the contents of maintenance. The managing apparatus 112 also transmits a message concerning the countervalue related to the maintenance contents registered in the knowledge managing table to the managing apparatus 122 provided at the manufacturing factory 120.

The managing apparatus 122 provided at the manufacturing factory 120 manages communication to the manufacturing factory 120. The managing apparatus 122 periodically monitors to determine whether or not a maintenance request has been received from each piece of semiconductor manufacture/inspection equipment 123. Upon detection of the reception of a maintenance request, the managing apparatus 122 transmits the maintenance request to the managing apparatus 122 of the maintenance center 110. The managing apparatus 122 also transmits the messages of maintenance operation, analysis start notice, analysis operation notice, and analysis completion notice transmitted from the managing apparatus 112 of the maintenance center 110 in response to the maintenance request, to the semiconductor manufacture/inspection equipment 123 that transmitted the maintenance request.

Figure 2:
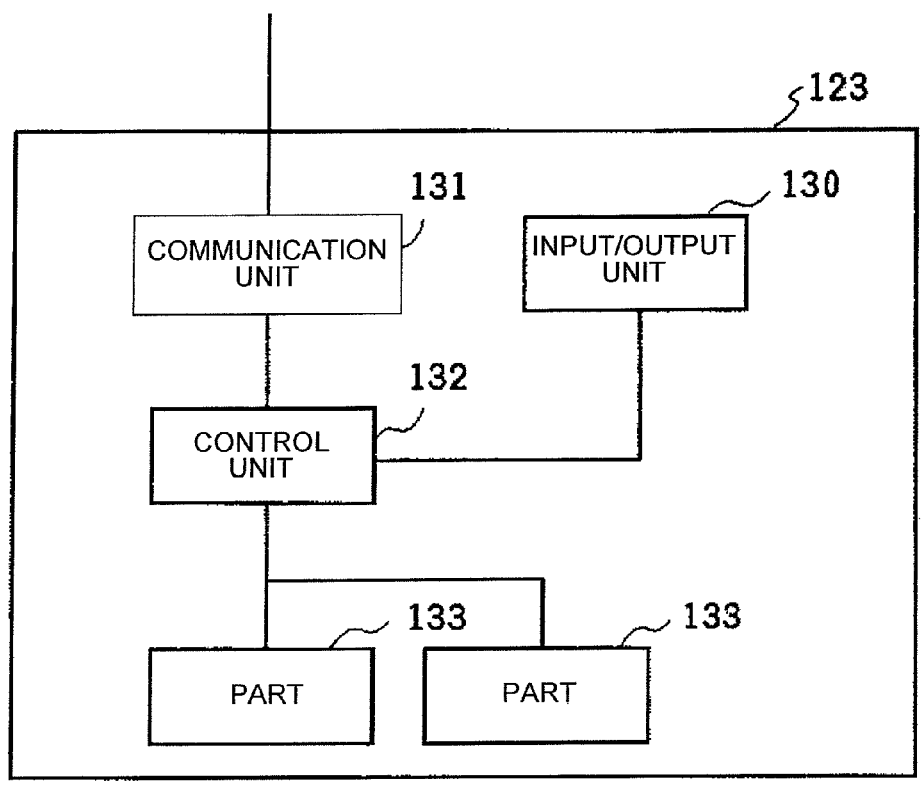
FIG. 2 shows a block diagram of semiconductor manufacture/inspection equipment.

The semiconductor manufacture/inspection equipment 123 provided at the manufacturing factory 120 is used by a user of the factory 120 in manufacturing semiconductor devices. FIG. 2 shows a block diagram of the semiconductor manufacture/inspection equipment 123, which includes an input/output unit 130 via which the user can input data ("a manufacturing operation") necessary for the manufacture of semiconductor devices. The semiconductor manufacture/inspection equipment 123 also includes a communication unit 131 for the transmission and reception of messages to and from the managing apparatus 122, the messages including a maintenance request, maintenance operation, analysis start notice, analysis operation notice, and analysis completion notice. The semiconductor manufacture/inspection equipment 123 further includes a control unit 132 for running programs in accordance with the maintenance operation or manufacturing operation, and parts 133 controlled by the control unit 132.

The input/output unit 130, upon reception of manufacturing operation fed by the user, transmits a program ID designated by the thus input manufacturing operation, and data ("a command") in which parameters to be given to a program designated by the program ID are stored, to the control unit 132. Upon reception of data ("a command response") in which the result of execution of the program is stored from the control unit 132, the input/output unit 130 extracts the program execution result from the received command response and outputs it to the output unit.

The input/output unit 130, in response to a request from the communication unit 131, also outputs the data that has been recorded since the reception of the analysis start notice to the reception of the analysis completion notice, to the output unit. The communication unit 131 periodically monitors the state of operation of the semiconductor manufacture/inspection equipment 123. In case a trouble is detected, the communication unit 131 generates a maintenance request in which the equipment ID of the semiconductor manufacture/inspection equipment 123 and the error code for the trouble are stored, and transmits it to the managing apparatus 112 at the maintenance center 110 via the managing apparatus 122. Upon reception of a maintenance operation transmitted from the maintenance apparatus 113 in response to the maintenance request, the communication unit 131 generates a command in which the program ID and parameters stored in the received maintenance operation are stored, and transmits it to the control unit 132.

There are two kinds of command, namely a reading command and a solving command. In a reading command, the program ID identifies a reading program. In a solving command, the program ID identifies a solving program.

The communication unit 131, upon reception of the command response that is transmitted from the control unit 132 in response to the command, generates data to be stored in a maintenance operation response on the basis of the data stored in the received command response. The communication unit 131 then transmits the maintenance operation response containing the generated data to the maintenance apparatus 113 that transmitted the maintenance operation. When the command response transmitted from the control unit 132 is a response to a reading command, the communication unit 131 generates, with regard to the equipment data stored in the command response, an equipment data ID identifying the equipment data, a common key to be used in encrypting the equipment data, common key disclosure conditions indicating the conditions concerning the disclosure of the common key, and event transmission rules indicating the rules concerning the transmission of the history of operation to the semiconductor manufacture/inspection equipment 123. The communication unit 131 then registers these items of data in a common-key managing table in a mutually related manner. The communication unit 131 then encrypts the equipment data stored in the command response using the registered common key, and then stores an equipment data package comprised of the generated equipment data ID, the encrypted equipment data, and the event transmission rules in the maintenance operation response. The event transmission rules may be encrypted using the common key with which the equipment data was encrypted.

The communication unit 131, when the command response transmitted from the control unit 132 is a response to a solving command, stores the message data stored in the command response in the maintenance operation response. The communication unit 131 also registers maintenance personnel attributes indicating the attributes of maintenance personnel in a maintenance personnel attribute managing table. The data stored in the maintenance personnel attributes includes a maintenance personnel password and maintenance personnel type. The maintenance attributes are input by the user in advance. Upon reception of an analysis start notice from the maintenance apparatus 113, the communication unit 131 verifies a maintenance worker by comparing the maintenance personnel password stored in the analysis start notice with that stored in the maintenance attribute-managing table. By this verification, the maintenance worker can be identified by unique identifiers.

The communication unit 131, upon reception of an analysis start notice from the maintenance apparatus 113, searches the common-key managing table for the common-key disclosure condition, using the equipment data ID stored in the notice as a key. The communication unit 131 retrieves the common key from the common-key managing table using the equipment data ID stored in the analysis start notice as a key only when the condition in the common-key disclosure condition is met by the attributes of the maintenance worker, and transmits an analysis start notice response in which the common key is stored to the maintenance apparatus 113 from which the analysis start notice has been received.

The communication unit 131, upon reception of the messages of analysis start notice, analysis operation notice, and analysis completion notice from the maintenance apparatus 113, records the data stored in each message in an analysis-state managing table. The communication unit 131, upon reception of an analysis completion notice from the maintenance apparatus 113, refers the analysis-state managing table for the data that has been recorded since the reception of the analysis start notice to the reception of the analysis completion notice. The communication unit 131 then requests the input/output unit 130 via the control unit 132 that it output the above data to the output unit.

The control unit 132 has the function of storing a reading program and a solving program in a program managing table. The control unit 132, upon reception of a command from the communication unit 131, runs a program designated by the command using the parameters associated with the program. The control unit 132 then transmits a command response in which program execution results are stored to the communication unit 131. The control unit 132, when the command received from the communication unit 131 is a reading command, uses equipment data that has been read as program execution results. When the command received from the communication unit 131 is a solving command, the control unit 132 uses message data outputted by a solving program as the program execution results. The control unit 132 also records data ("program execution history") concerning the history of commands transmitted by the input/output unit 130 in a program execution-history managing table. The program execution history stores information about what program was executed, by which user such program was used, which parameters were used, and when it was executed.

The control unit 132 also records data ("sensor-state history") indicating how the state of each part 133 has transitioned in a sensor-state history managing table. The sensor-state history stores information about which part was transitioned, into what state such part was transitioned and when the transition took place. The control unit 132 also records data ("processing results") indicating the state of a wafer processed by each part 133 in a processing result-managing table. The processing result stores information about which wafer transitioned into which state.

Figure 3:
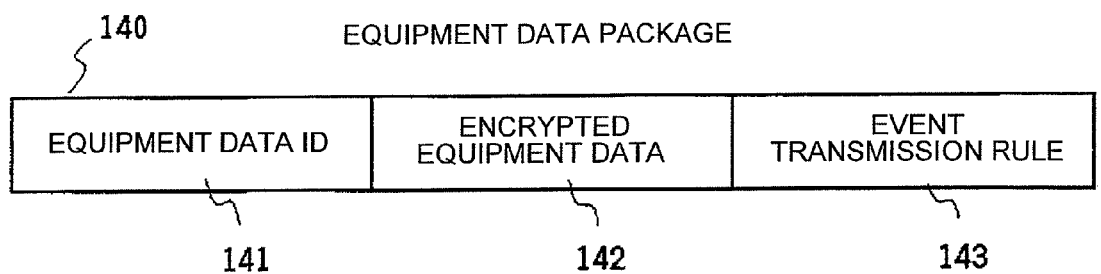
FIG. 3 shows the structure of an encrypted equipment data package.

Hereafter, the structure of the equipment data package stored in the maintenance apparatus 113 and the managing apparatus 112 will be described. FIG. 3 shows an example of the equipment data package. An equipment data package 140 is comprised of an equipment data ID 141, an encrypted equipment data 142, and event transmission rules 143. The equipment data ID 141 stores data identifying the equipment data stored in the encrypted equipment data 142 in an encrypted form. The encrypted equipment data 142 stores equipment data that has been read and which has been encrypted using the common key. The event transmission rules 143 stores data concerning the transmission of the history of operation by maintenance personnel on the encrypted equipment data stored in the encrypted equipment data 142 to the semiconductor manufacture/inspection equipment 123.

In the following, the structure of tables managed by the semiconductor manufacture/inspection equipment 123 will be described. FIG. 4 shows an example of the common-key managing table managed by the communication unit 131 in the semiconductor manufacture/inspection equipment 123. Each row of a common-key managing table 150, in which a common key and a common-key disclosure condition are stored for each item of equipment data, is comprised of an equipment data ID 151, a common key 152, and a common-key disclosure condition 153. The equipment data ID 151 stores data identifying the equipment data. The common key 152 stores data indicating the common key that is used when decrypting the equipment data identified by the value stored in the equipment data ID 151. The common-key disclosure condition 153 stores data indicating the condition about the attributes of a maintenance worker that are required in order to disclose the value stored in the common key 152. In the present example, the common key for the equipment data D1 is ABC . . . , indicating that the key is only disclosed to upper-level maintenance personnel. The common key for the equipment data D2 is CBA . . . , indicating that the key is only disclosed to upper- and intermediate-level maintenance personnel.

FIG. 5 shows an example of the maintenance personnel attribute managing table managed by the communication unit 131 in the semiconductor manufacture/inspection equipment 123. Each row of a maintenance personnel attribute managing table 160 stores the attributes of each maintenance worker and is comprised of a maintenance personnel ID 161, a maintenance personnel password 162, and a maintenance personnel type 163. The maintenance personnel ID 161 stores data identifying each maintenance worker. The maintenance personnel password 162 stores data indicating each maintenance worker's password. The maintenance personnel type 163 stores data indicating the type of each maintenance worker. In the illustrated example, the password for maintenance worker D1 is 1234, and he or she is an upper-level maintenance worker. Similarly, the password for maintenance worker D2 is 5678, and he or she is an intermediate-level maintenance worker.

FIG. 6 shows an example of the analysis-state managing table managed by the communication unit 131 of the semiconductor manufacture/inspection equipment 123. Each row of an analysis-state managing table 170 stores the contents of an analysis start notice, analysis operation, and analysis completion notice that have been received by the communication unit 131 of the semiconductor manufacture/inspection equipment 123 for each particular trouble. Each row is comprised of an analysis work ID 171, an equipment data ID 172, a recorded date 173, a company ID 174, a maintenance personnel ID 175, and contents 176. The analysis work ID 171 stores data identifying analysis work. The equipment data ID 172 stores data identifying the equipment data as the object of analysis. The recorded date 173 stores data indicating the date on which the history was recorded. The maintenance personnel type 174 stores data indicating the type of the maintenance worker who did the analysis work. The maintenance personnel ID 175 stores data identifying the analysis worker who did the analysis work. The contents 176 stores data indicating the contents of an analysis start notice, analysis operation, and analysis completion notice.

In the illustrated example, it can be seen that the analysis work is analysis work 101, the encrypted data that has been analyzed is encrypted data D1, and the maintenance worker who did the analysis is maintenance worker A1, an upper-level maintenance worker. It can also be seen that in the analysis work 101, a common key was obtained from the semiconductor manufacture/inspection equipment 123 at 11:10:00 on Jan. 3, 2001; encrypted equipment data was decrypted using the common key at 11:10:30 on Jan. 3, 2001; the operation of a transfer system was animation-displayed at 11:11:00 on Jan. 3, 2001; the operation of a ventilation system was animation-displayed at 11:11:30 on Jan. 3, 2001; the operation of an optical system was animation-displayed at 11:12:00 on Jan. 3, 2001; the operation of the optical system was timing-chart displayed at 11:12:30 on Jan. 3, 2001; the operation of the optical system was overlay-displayed at 11:13:00 on Jan. 3, 2001; the cause of trouble was determined to exist in the optical system at 11:13:30 on Jan. 3, 2001; the decrypted equipment data was deleted at 11:14:00 on Jan. 3, 2001; and the obtained common key was deleted at 11:14:30 on Jan. 3, 2001.

FIG. 7 shows an example of the program managing table managed by the control unit 132 of the semiconductor manufacture/inspection equipment 123. Each row of a program managing table 180 stores a program run by the control unit 132, and is comprised of program ID 181, program type 182, designation 183, process conditions 184, and process procedure 185. The program ID 181 stores data uniquely identifying individual programs. The program type 182 stores data indicating the type of each program. The designation 183 stores data indicating the designation of each program. The process condition 184 stores data indicating conditions concerning processes performed by the control unit 132. The process procedure 185 stores data indicating the procedure of processes performed by the control unit 132. There may exist programs that do not require the setting of process conditions.

In this example, program P1 is a program for reading a program, its type is a reading program, and it executes a procedure called READ PROGRAM. Program P2 is a program for reading a program execution history, its type is a reading program, and it carries out a procedure called READ PROGRAM EXECUTION HISTORY. Program P3 is a program for reading a sensor-state history, its type is a reading program, and it carries out a procedure called READ SENSOR-STATE HISTORY. Program P4 is a program for reading processing results, its type is a reading program, and it carries out a procedure called READ PROCESSING RESULT. Program P5 is a program for generating programs, its program type is a solving program, and it carries out a procedure called CREATE PROGRAM. Program P6 is a program for editing programs, its type is a solving program, and it carries out a procedure called EDIT PROGRAM. Program P7 is a program for deleting programs, its type is a solving program, and it carries out a procedure called DELETE PROGRAM. Program P8 is a program for processing a wafer in an automatic mode, its type is a solving program, and it processes the wafer automatically, using slot No. 1 on a wafer-by-wafer basis, with a processing condition that a measured wafer image be stored in image 1, and with the procedures of wafer loading, wafer alignment, addressing, measurement, and wafer unloading being carried out in sequence. Program P9 is a program for processing a wafer in a manual mode, its type is a solving program, it uses slot No. 2, and the processing proceeds on a cassette-by-cassette basis, with the processing condition that a measured wafer image be stored in image 2, and with the same procedures as those in program P8 being carried out.

FIG. 8 shows examples of the program execution-history managing table, the sensor-state history managing table, and the processing result-managing table that are managed by the control unit 132 of the semiconductor manufacture/inspection equipment 123. Each row of the program execution-history managing table 190 stores the history of execution of each program, and is comprised of an execution date 191, a user ID 192, a program ID 193, and parameters 194. The execution date 191 stores data indicating the date on which a program was run. The user ID 192 stores data identifying the user of the semiconductor manufacture/inspection equipment 123 in which the program was run. The program ID 193 stores data identifying a program that has been run. The parameters 194 stores data indicating the parameters given to the program that has been run.

In this example, it can be seen that a user U1 ran a program P8 at 10:10:10 on Jan. 2, 2001, and the user U1 ran program P9 at 10:15:10 on Jan. 2, 2001. Each row of the sensor-state history managing table 200 stores the history of states of each part 133 at each time, and is comprised of entries for recorded date 201 and sensor S1 202, sensor S2 203, . . . , and so on. The recording date 201 stores data indicating the date on which a state value of each part 127 was recorded. The sensor S1 202, sensor S2 202, . . . , and so on stores data indicating the state of each part 133 measured by each sensor. In this example, it can be seen that the state values for the individual parts 133 were 0.01, 0.10, ..., and so on at 10:10:10 on Jan. 2, 2001, and 0.02, 0.20, ..., and so on at 10:10:11 on Jan. 2, 2001.

Each row of the processing results managing table 210 stores the results of processing of each wafer, and is comprised of a wafer ID 211 and a wafer image 212. The wafer ID 211 stores data uniquely identifying each wafer. The wafer image 212 stores image data indicating the state of the surface of a wafer. In this example, it can be seen that the state of the surface of the wafer W1 is normal and that the state of the surface of wafer W2 is abnormal.

FIG. 9 shows an example of the knowledge managing table managed by the managing apparatus 112 provided at the maintenance center 110. Each row of the knowledge managing table 220 stores the history of analysis of the cause of trouble in each analysis work, and is comprised of an equipment ID 221, an error code 222, an equipment data package 223, and analysis results 224. The equipment ID 221 stores data identifying the semiconductor manufacture/inspection equipment 123 where a particular trouble occurred. The error code 222 stores data identifying the trouble at the semiconductor manufacture/inspection equipment 123. The equipment data package 223 stores the encrypted equipment data package that was used in identifying the cause of the trouble. The analysis results 224 stores data indicating the history of analysis of the cause of the trouble.

In this example, the cause of the trouble with the error code E0123 that occurred in the semiconductor manufacture/inspection equipment T1 was identified by analyzing the equipment data package P1 as described in analysis results R1. Similarly, the cause of the trouble with error code E0124 that occurred in the semiconductor manufacture/inspection equipment T1 was identified by analyzing the equipment data package P2 as described in analysis results R2.

Figure 10:
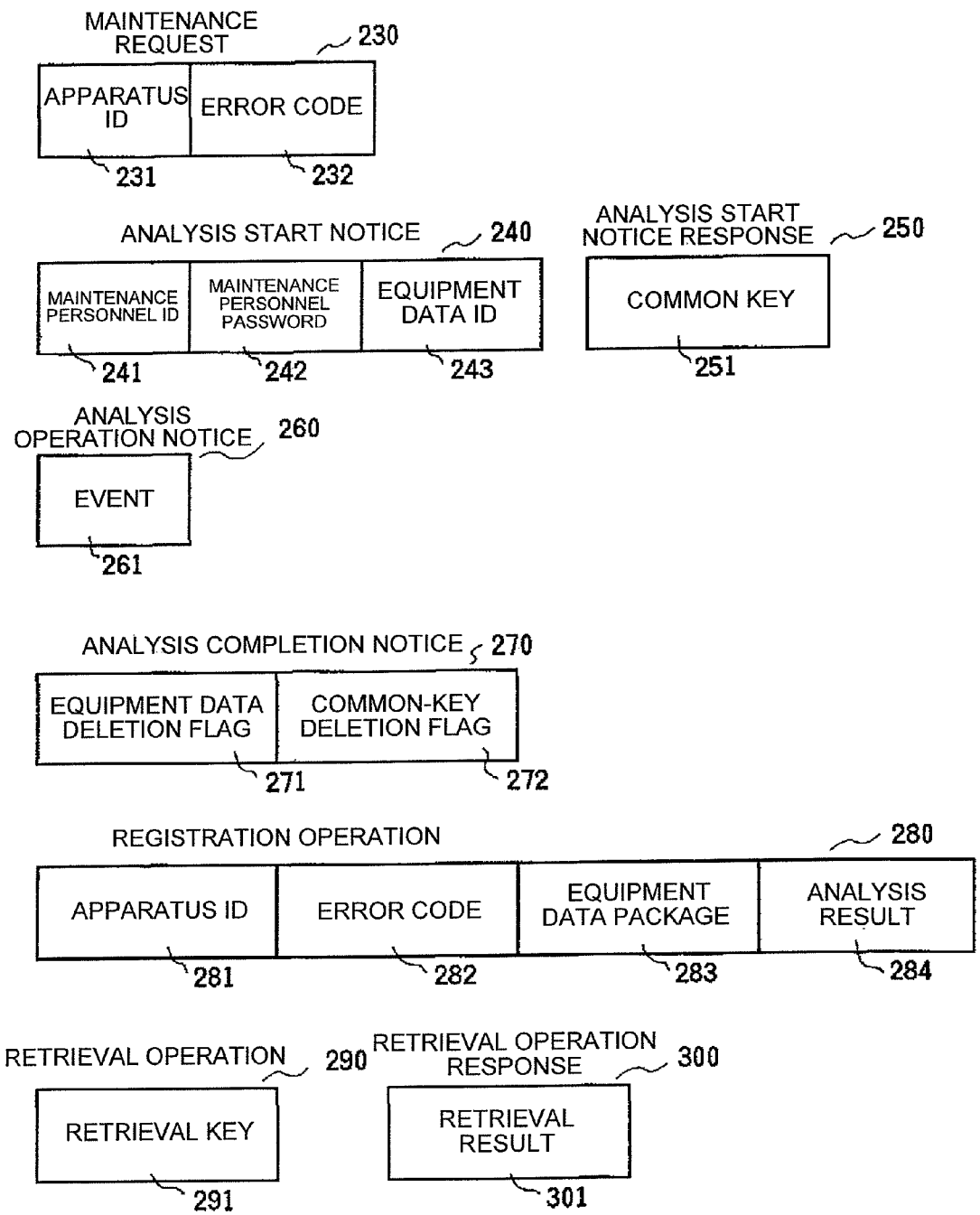
FIG. 10 shows the structure of message data transmitted and received between semiconductor manufacture/semiconductor manufacture/inspection equipment and a maintenance apparatus.

Hereafter, the structure of the messages transmitted and received among the maintenance apparatus 113, the semiconductor manufacture/inspection equipment 123 and the managing apparatus 112 will be described. FIG. 10 shows examples of the messages of maintenance request, analysis start notice, analysis start notice response, analysis operation notice, and analysis completion notice that are transmitted and received between the maintenance apparatus 113 and the semiconductor manufacture/inspection equipment 123. FIG. 10 also shows examples of the messages of registration operation, retrieval operation, and retrieval operation response that are transmitted and received between the maintenance apparatus 113 and the managing apparatus 112.

A maintenance request 230 is a message the semiconductor manufacture/inspection equipment 123 transmits to the maintenance apparatus 113 in order to request maintenance, and is comprised of an equipment ID 231 and an error code 232. The equipment ID 231 stores data identifying the semiconductor manufacture/inspection equipment where a trouble has been detected. The error code 232 stores data indicating the nature of the trouble. The maintenance request may include items for the date on which the trouble was detected, the ID for the semiconductor device manufacturing factory, and the type of the semiconductor manufacture/inspection equipment.

An analysis start notice 240 is a message the maintenance apparatus 113 transmits to the semiconductor manufacture/inspection equipment 123 for notifying it of the start of an analysis work. The message is comprised of a maintenance personnel ID 241, a password 242, and an equipment data ID 243. The maintenance personnel ID 241 stores data identifying the maintenance worker who carries out the analysis work. The password 242 stores data indicating the password for the maintenance worker who carries out the analysis work. The equipment data ID 243 stores data identifying the encrypted equipment data that is subjected to the analysis work.

An analysis start notice response 250 is a message the semiconductor manufacture/inspection equipment 123 transmits to the maintenance apparatus 113 for handing the common key to be used in decrypting the encrypted equipment data, and the message is comprised of a common key 251. The common key 251 stores data indicating the common key to be used in decrypting the encrypted equipment data to be analyzed.

An analysis operation notice 260 is a message the maintenance apparatus 113 transmits to the semiconductor manufacture/inspection equipment 123 for notifying the history of operations carried out on the equipment data by an analyzing worker. The message is comprised of an event 261. The event 261 stores data indicating the history of operations carried out on the equipment data by a maintenance worker.

An analysis completion notice 270 is a message the maintenance apparatus 113 transmits to the semiconductor manufacture/inspection equipment 123 in order to notify the completion of an analysis work. The message is comprised of an equipment data deletion flag 271 and a common-key deletion flag 272. The equipment data deletion flag 271 stores data indicating that the decrypted equipment data has been deleted. The common-key deletion flag 272 stores data indicating that the common key has been deleted. A registration operation 280 is a message the maintenance apparatus 113 transmits to the semiconductor manufacture/inspection equipment 123 for registering the knowledge about maintenance. The message is comprised of an equipment ID 281, an error code 282, an equipment data package 283, and analysis results 284.

The equipment ID 281 stores data identifying the semiconductor manufacture/inspection equipment that carried out analysis. The error code 282 stores data indicating the nature of the trouble in the semiconductor manufacture/inspection equipment that was analyzed. The equipment data package 283 stores the equipment data package that was used in identifying the cause of the trouble. The analysis results 284 stores data indicating the history of analysis of the cause of the trouble.

A retrieval operation 290 is a message which the maintenance apparatus 113 transmits to the semiconductor manufacture/inspection equipment 123 in order to retrieve the knowledge about maintenance, and is comprised of a retrieval key 291. The retrieval key 291 stores data identifying the semiconductor manufacture/inspection equipment and data specifying the nature of the trouble.

A retrieval operation response 300 is a message which the semiconductor manufacture/inspection equipment 123 transmits to the maintenance apparatus 123 in order to return the knowledge about maintenance that has been retrieved. The message is comprised of retrieval results 301. The retrieval results 301 stores data that has been retrieved using a retrieval key.

Figure 11:
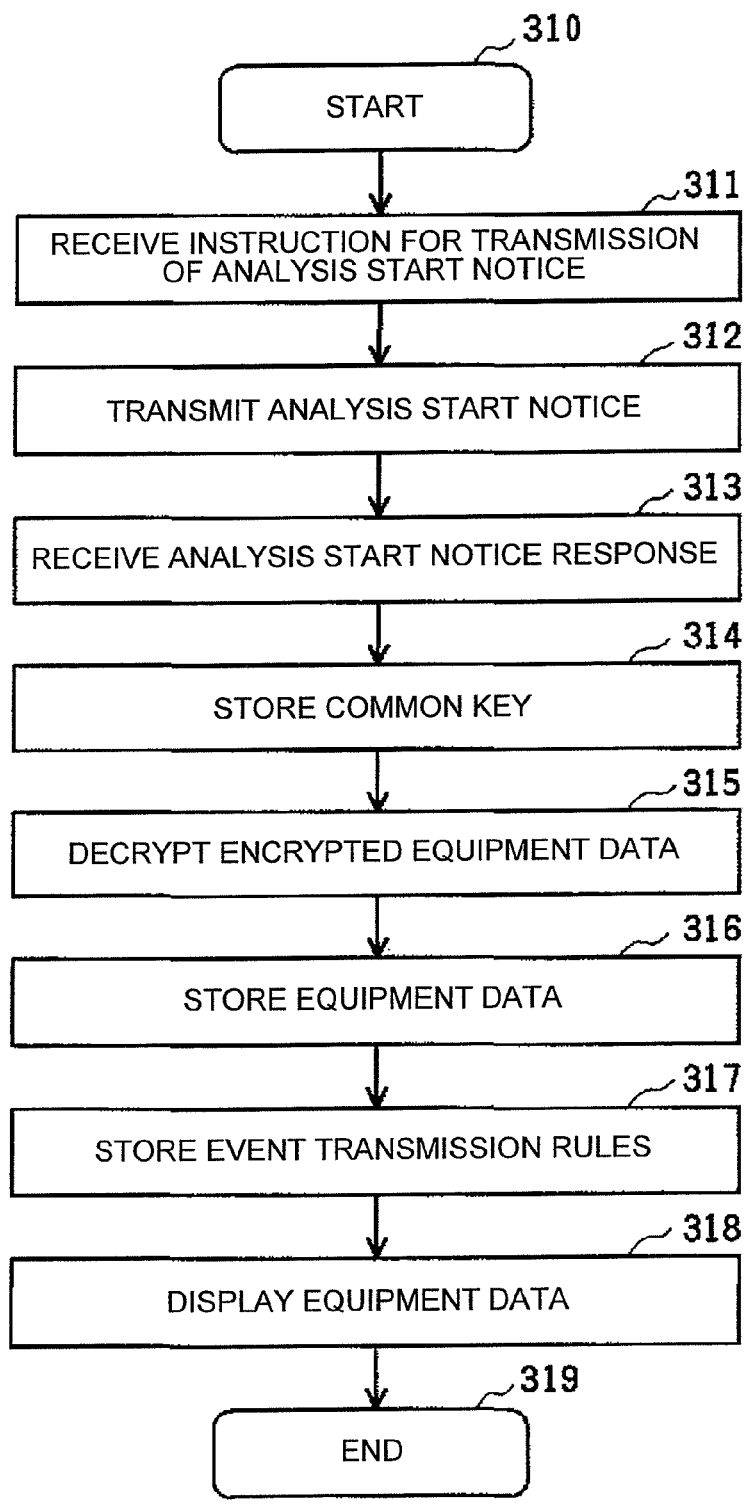
FIG. 11 shows a flowchart of the operation of the maintenance apparatus when transmitting and receiving an analysis start notice and an analysis start response.

Hereafter, the flow of the processes carried out by each of the maintenance apparatus 113, semiconductor manufacture/inspection equipment 123, and managing apparatus 112 shown in FIG. 1 will be described. FIG. 11 shows a flowchart of the operation of the maintenance apparatus 113 when transmitting and receiving an analysis start notice 240 and an analysis start notice response 250.

First, the maintenance apparatus 113 receives an instruction from a maintenance worker to transmit the analysis start notice 240 (step 311). The maintenance apparatus 113 then transmits the analysis start notice 240 in which the maintenance personnel ID, the maintenance personnel password, and the equipment data ID for the equipment data package 140 are stored to the semiconductor manufacture/inspection equipment 123 from which a maintenance request 230 has been received (step 312). The maintenance apparatus then receives an analysis start notice response 250 transmitted from the semiconductor manufacture/inspection equipment 123 in response to the analysis start notice 240 (step 313). The maintenance apparatus 113 then stores the common key stored in the analysis start notice response 250 in the main memory unit (step 314). The maintenance apparatus 113 then decrypts the encrypted equipment data stored in the equipment data package 140 using the stored common key (step 315). The maintenance apparatus 113 then stores the decrypted equipment data in the main memory unit (step 315). Next, the maintenance apparatus 113 stores the event transmission rules stored in the equipment data package 140 in the main memory unit (step 317). The maintenance apparatus 113 then outputs the decrypted equipment data to the output unit (step 318), and the process comes to an end (step 319).

Figure 12:
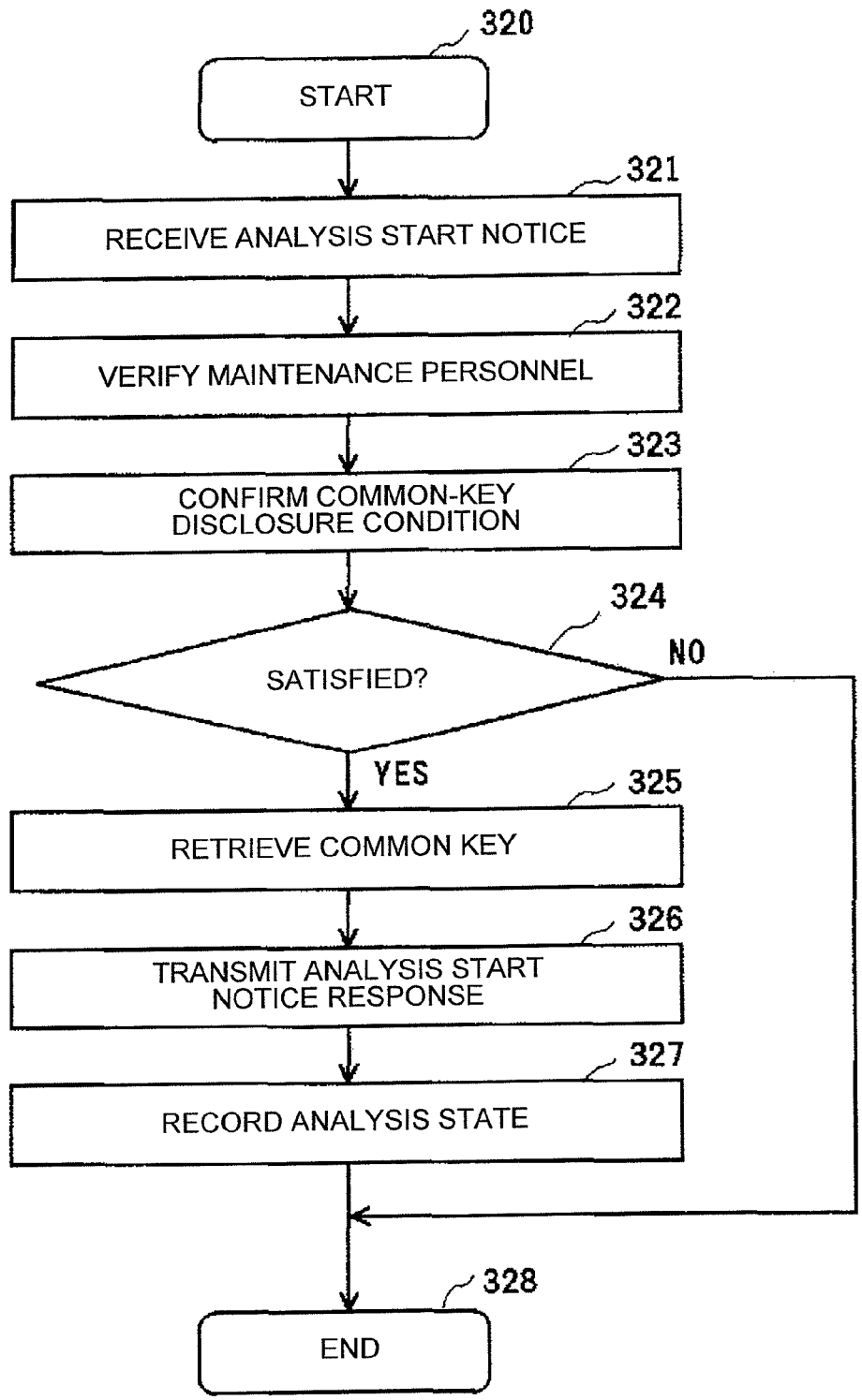
FIG. 12 shows a flowchart of the operation of a communication unit of semiconductor manufacture/semiconductor manufacture/inspection equipment when transmitting and receiving an analysis start notice and an analysis start response.

FIG. 12 shows a flowchart of the operation of the communication unit 131 of the semiconductor manufacture/inspection equipment 123 as it receives and transmits the analysis start notice 240 and the analysis start notice response 250. The communication unit 131 initially receives the analysis start notice 240 from the maintenance apparatus 113 (step 321). The communication unit 131 then verifies the maintenance worker by comparing the maintenance personnel password stored in the analysis start notice 240 with that stored in the maintenance attribute managing table (step 322). Next, the communication unit 131 retrieves a common-key disclosure condition from the common-key managing table, using the equipment data ID stored in the analysis start notice 240 as a key, and determines whether or not the attributes of the maintenance worker satisfy the retrieved common-key disclosure condition (step 323). If satisfied, the communication unit 131 retrieves the common key from the common-key managing table, using the equipment data ID stored in the analysis start notice 240 as a key (step 325). If not, the process comes to an end (step 328). Next, the communication unit 131 transmits the analysis start notice response 250 in which the retrieved common key is stored to the maintenance apparatus 113 from which the analysis start notice 240 has been received (step 326). After recording the contents of the analysis start notice response 250 that has been transmitted in the analysis-state managing table (step 327), the process comes to an end (step 328).

FIG. 13 shows a flowchart of the operation of the maintenance apparatus 113 as it transmits an analysis operation notice. First, the maintenance apparatus 113 receives an instruction from the maintenance worker to carry out an operation on the equipment data outputted to the output unit (step 331). The maintenance apparatus 113 then generates event data indicating the contents of the operation it has accepted (step 332). Next, the maintenance apparatus 113 transmits an analysis operation notice in which the generated event data is stored to the semiconductor manufacture/inspection equipment 123 from which the maintenance request has been received, in accordance with the stored event transmission rules (step 333). The process then comes to an end (step 334).

FIG. 14 shows a flowchart of the operation of the communication unit 131 of the semiconductor manufacture/inspection equipment 123 upon reception of the analysis operation notice. The communication unit 131 initially receives the analysis operation notice 260 from the maintenance apparatus 113 (step 341). Then, the communication unit 131 records the data stored in the analysis operation notice 260 in the analysis state table (step 342), and then the process comes to an end (step 343).

Figure 15:
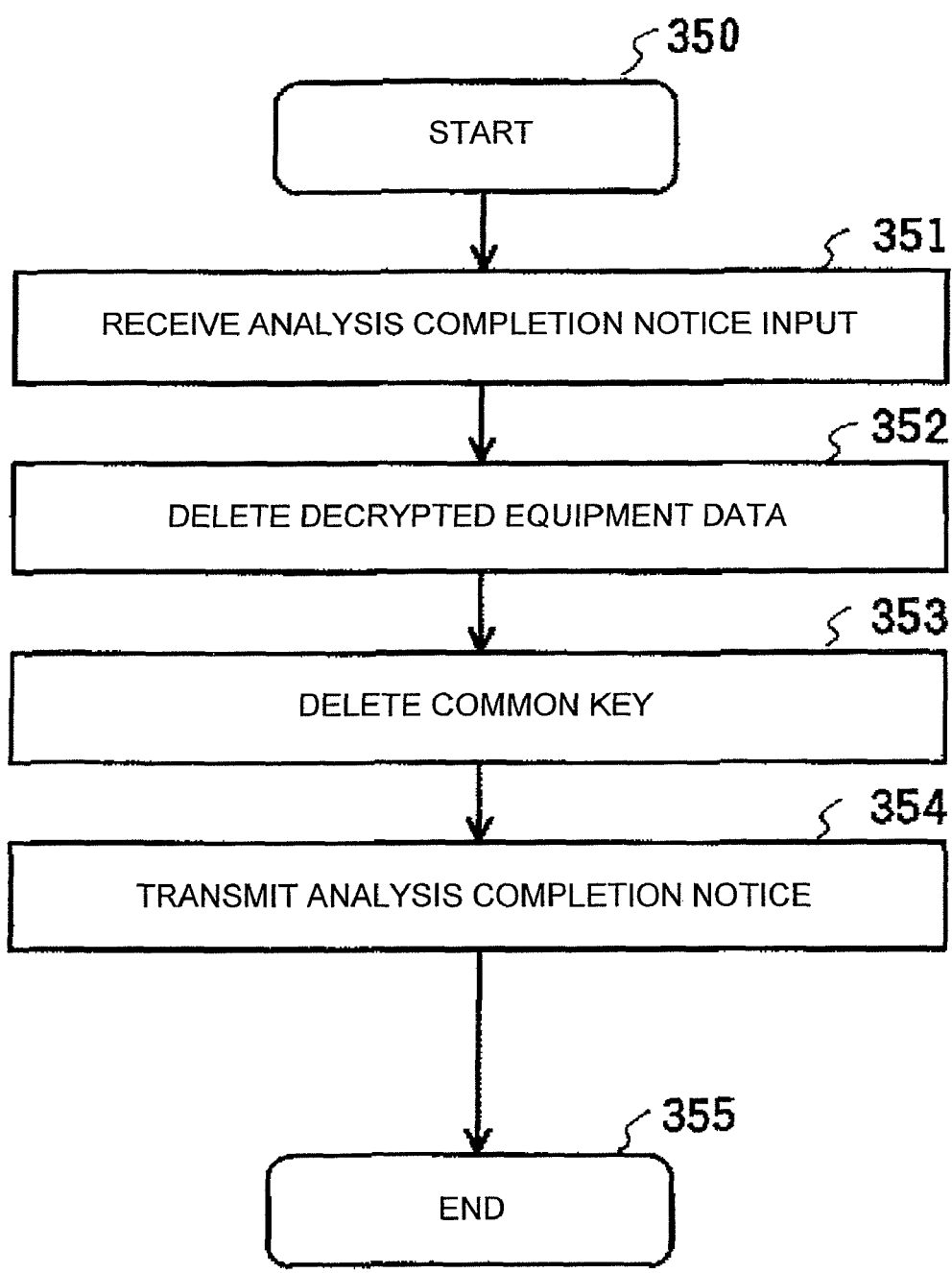
FIG. 15 shows a flowchart of the operation of the maintenance apparatus when transmitting an analysis completion notice.

FIG. 15 shows a flowchart of the operation of the maintenance apparatus 113 as it transmits an analysis completion notice. First, the maintenance apparatus 113 receives an instruction from the maintenance worker to transmit an analysis completion notice (step 251). Then, the maintenance apparatus 113 deletes the equipment data stored in the main memory unit (step 252). The maintenance apparatus 113 then deletes the common key stored in the main memory unit (step 253). Next, the maintenance apparatus 113 transmits the analysis completion notice to the semiconductor manufacture/inspection equipment 123 from which the maintenance request 230 has been received, the analysis completion notice containing data indicating that the equipment data and the common key stored in the main memory unit have been deleted (step 254). Then, the process comes to an end (step 255).

Figure 16:
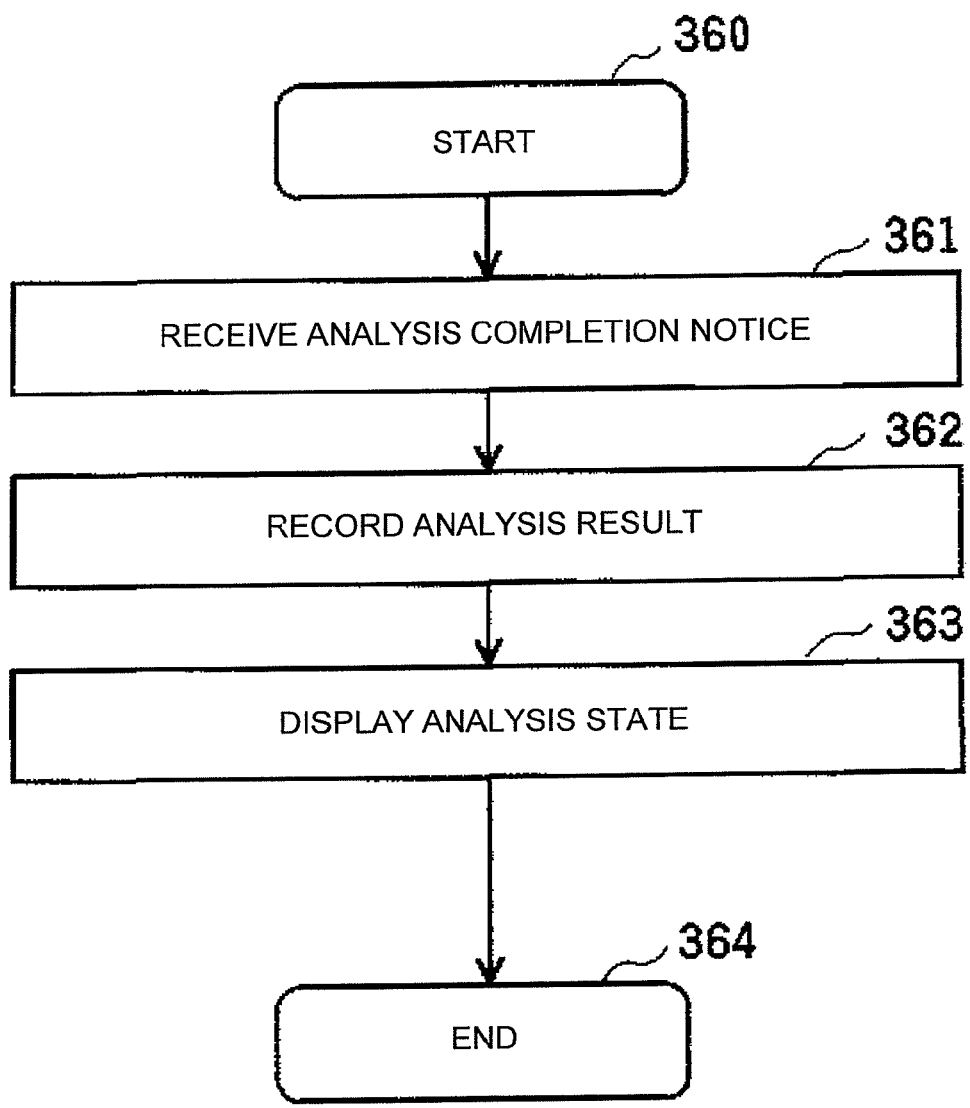
FIG. 16 shows a flowchart of the operation of the communication unit of the semiconductor manufacture/inspection equipment when receiving the analysis completion notice.

FIG. 16 shows a flowchart of the operation of the communication unit 131 of the semiconductor manufacture/inspection equipment 123 upon reception of the analysis completion notice. First, the communication unit 131 receives the analysis completion notice from the maintenance apparatus 113 (step 361). The communication unit 131 then records the contents of the received analysis completion notice in the analysis-state managing table (step 362). Then, the communication unit 131 reads data concerning the particular analysis work from the analysis-state managing table, and outputs the data to the output unit (step 363). The process then comes to an end (step 364).

Figure 17:
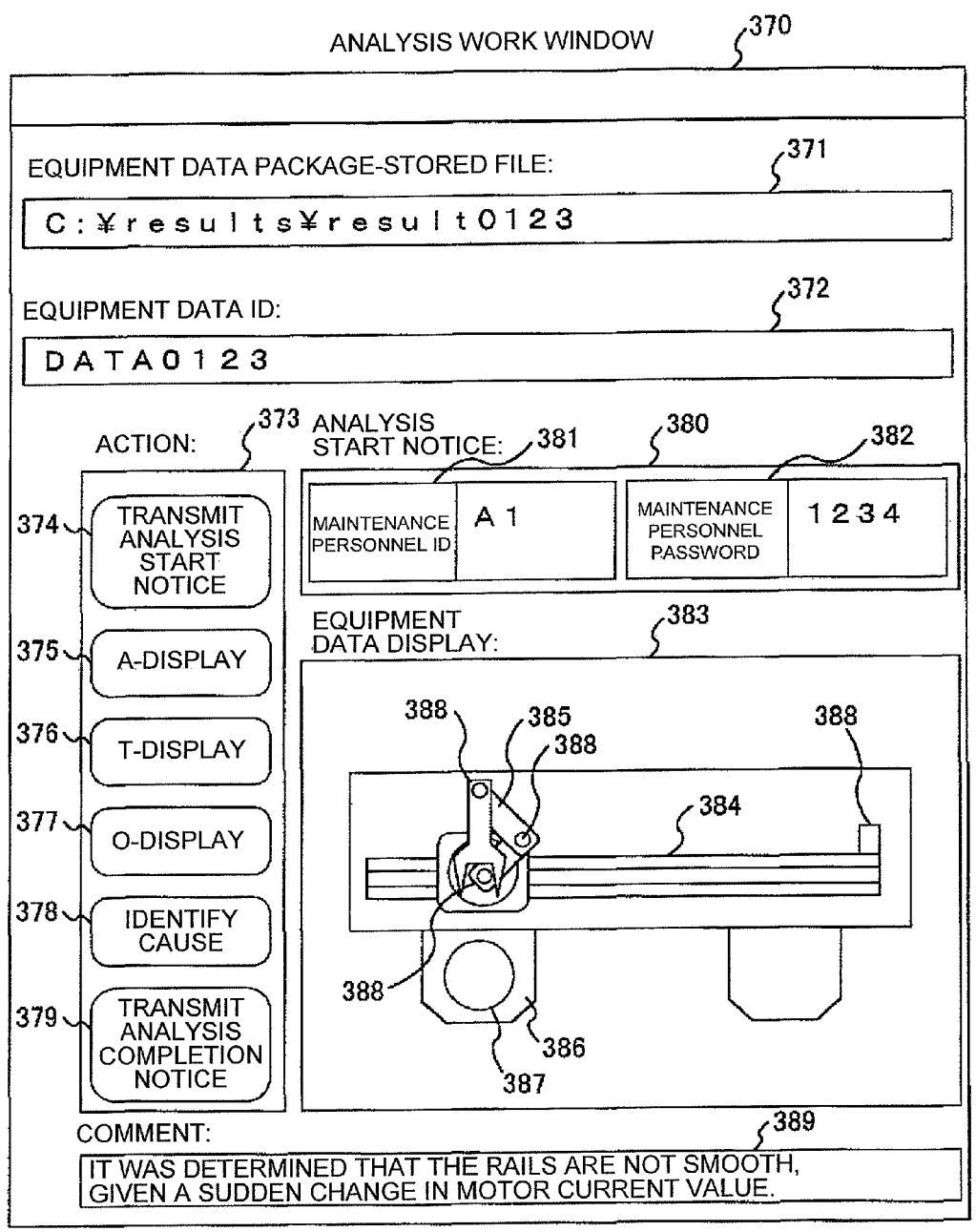
FIG. 17 shows an analysis work window displayed on the maintenance apparatus.

Hereafter, a window that is displayed on the output unit of the semiconductor manufacture/inspection equipment 123 and that of the maintenance apparatus 113 shown in FIG. 1 will be described. FIG. 17 shows an example of an analysis work window that is displayed on the output unit of the maintenance apparatus 113 in steps 311 and 318 of the process flow shown in FIG. 11, in step 331 of the process flow shown in FIG. 13, and in step 351 of the process flow shown in FIG. 15.

A maintenance work window 370 shows the equipment data ID stored in an equipment data package 140 designated by a maintenance worker. On this window, the maintenance worker can enter instructions for the transmission of an analysis start notice 240, an analysis operation notice 260, and an analysis completion notice 270. The window is composed of an equipment data package-stored file field 371, an equipment data ID panel 372, an action panel 373, an analysis start notice panel 380, an equipment data display panel 383, and a comment field 389.

The equipment data package-stored file field 371 is where the maintenance worker can enter the name of a file in which the equipment data package 140 to be analyzed is stored. In the illustrated example, the equipment data package 140 to be analyzed is stored in C: ¥results¥result0123.

The equipment data ID panel 372 is where the value of the equipment data ID that is stored in the equipment data package 140 designated in the equipment data package-stored file field 371 is shown to the analyzing worker. In the illustrated example, the value of the equipment data ID is D1.

The action panel 373 is where the maintenance worker can enter instructions for the transmission of an analysis start notice 240, analysis operation notice 260, and analysis completion notice 270. The action panel 373 is composed of an analysis start notice transmission button 374, analysis operation notice transmission buttons 375, 376, 377, and 378, and an analysis completion notice transmission button 379.

The analysis start notice transmission button 374 is for the maintenance worker to enter the instruction to transmit an analysis start notice 240. As this button is depressed by the maintenance worker using a mouse, an analysis start notice 240 is transmitted to the semiconductor manufacture/inspection equipment 123 from which the maintenance request 230 has been received, the notice containing the maintenance personnel ID and maintenance personnel password that have been entered on the analysis start notice panel 380 and the equipment data ID shown on the equipment data ID panel 372.

The analysis operation notice transmission buttons 375, 376, 377, and 378 are for the maintenance worker to enter an instruction for the transmission of a maintenance operation notice 270. When one of these buttons is depressed by the maintenance worker using a mouse, event data indicating the history of operation associated with the depressed button is generated. Then an analysis operation notice 260 is transmitted to the semiconductor manufacture/inspection equipment 123 from which the maintenance request 230 has been received in accordance with the stored event transmission rules, the notice containing the generated event data. In the illustrated example, the analysis operation notice transmission button 375 indicates that the equipment data is to be animation-displayed (A-display) and that event data indicating that animation display has taken place is generated and transmitted.

The analysis operation notice transmission button 376 indicates that the equipment data is to be timing chart-displayed (T-display) and that event data indicating that timing-chart display has taken place is generated and transmitted.

The analysis operation notice transmission button 377 indicates that the equipment data is to be overlay-displayed (O-display) and that event data indicating that overlay display has taken place is generated and transmitted.

The analysis operation notice transmission button 378 indicates that event data indicating that the cause of trouble has been identified is generated and transmitted. The grounds for the decision entered in a comment field 389 by the maintenance worker are also stored in the event data indicating the identification of the cause of trouble.

The analysis completion notice button 379 is for the maintenance worker to enter an instruction for the transmission of an analysis completion notice 270. When this button is depressed by the maintenance worker using a mouse, the equipment data and the common key stored in the main memory unit are deleted. Then, an analysis completion notice containing data indicating the deletion is transmitted to the semiconductor manufacture/inspection equipment 123 from which the maintenance request 230 has been received.

The analysis start notice panel 380 is where the analyzing worker enters his or her ID and password to be stored in an analysis start notice 240. The panel is composed of a maintenance personnel ID field 381 and a maintenance personnel password field 382.

The maintenance personnel ID field 381 is where the maintenance worker enters his or her ID using a keyboard. In the illustrated example, the maintenance ID is A1. The maintenance personnel password field 382 is where the maintenance worker enters his or her password using a keyboard. In the illustrated example, the maintenance personnel password is 1234. An equipment data display panel 383 shows the decrypted equipment data to the maintenance worker.

In the illustrated example, the maintenance worker has depressed the analysis operation notice button 375, so that the operation of a robot arm 385 mounted on the rails 384 taking out a wafer 387 from a cassette 386 is shown via animation. When the maintenance worker depresses the analysis operation notice transmission button 376 or 377, the equipment data can be displayed via a timing chart or one on which other equipment data that has been recorded in advance is overlaid.

The comment field 389 is where the maintenance worker enters, using a keyboard, the grounds based on which he or she has determined the cause of a trouble. In the illustrated example, it can be seen that the maintenance worker decided that the rails are not smooth because there are abrupt fluctuations in the motor current value.

FIG. 18 shows an example of an analysis-state output window outputted to the output unit of the semiconductor manufacture/inspection equipment 123 in step 363 of the process flow shown in FIG. 16. An analysis state output window 390 shows the history of analysis that has been recorded since the reception of the analysis start notice 240 to the reception of the analysis completion notice 270 for the user of the semiconductor manufacture/inspection equipment 123. The window includes an analysis state list 391. Each row of the analysis state list 391 shows the contents of the analysis start notice 240, analysis operation 260, and analysis completion notice 270 that have been received by the communication unit 131 of the semiconductor manufacture/inspection equipment 123 regarding a particular trouble. The rows are composed of an analysis work ID field 392, an equipment data ID field 393, a recorded date field 394, a maintenance personnel type field 395, a maintenance personnel ID field 396, and a content field 397. The contents of the individual fields are the same as the data stored in the individual entries of the analysis-state managing table 170, and are, therefore, not described.

Thus, the system according to the present embodiment is made up of one or more pieces of industrial equipment for performing certain processes, and a maintenance apparatus for maintaining the industrial equipment, which are connected via the Internet. The industrial equipment is provided with an encryption unit, a communication unit, and an input/output unit. The encryption unit encrypts equipment information indicating the state of the industrial equipment, using a predetermined common key. The communication unit transmits the equipment information encrypted by the encryption unit to the maintenance apparatus in response to a request therefrom. The communication unit also transmits the common key used in encrypting the equipment information to the maintenance apparatus that has received the encrypted equipment information in response to a request therefrom. The input/output unit outputs all or part of the history of transmission of the common key from the industrial equipment to the maintenance apparatus. The maintenance apparatus includes a communication unit, a decryption unit, and an input/output unit. The communication unit receives the encrypted equipment information transmitted from the communication unit of the industrial equipment, and the common key used in encrypting the equipment information from the industrial equipment after requesting it therefrom. The decryption unit stores the common key received by the communication unit of the maintenance apparatus, and decrypts the encrypted equipment information using the stored common key. The input/output unit stores the equipment information decrypted by the decryption unit, and outputs all or part of the stored equipment information.

Thus, it is possible to disclose the equipment information stored in each piece of the industrial equipment to the maintenance personnel safely to the extent permitted by the user of the industrial equipment. The input/output unit of the industrial equipment outputs the encrypted equipment information to a memory medium, and the input/output unit of the maintenance apparatus receives that encrypted equipment information from the memory medium. Thus, it is possible to input the encrypted equipment information to the maintenance apparatus using any desired medium.

The communication unit of the industrial equipment encrypts the common key using a public key associated with the maintenance apparatus. The communication unit of the maintenance apparatus decrypts the common key received from the communication unit of the industrial equipment using a secret key associated with the public key. Thus, the common key can be transmitted to the maintenance apparatus safely.

The communication unit of the industrial equipment carries attribute information indicating the attributes of the user of the maintenance apparatus, and Condition information concerning the attributes of the user of the maintenance apparatus that are required when transmitting the common key. When the common key is requested by the maintenance apparatus, the communication unit reads the user's attribute information and the condition information about the common key, and transmits the common key to the maintenance apparatus only when the condition in the condition information that has been read is satisfied by the attributes in the attribute information that has been read. Thus, it is possible to transmit the common key only to a specific maintenance worker.

The decryption unit of the maintenance apparatus stores rules limiting the operation on the common key received by the communication unit of the maintenance apparatus, and limits the operation on the common key received by the communication unit of the maintenance apparatus according to the stored rules. Thus, it is possible to manage the common key in the maintenance apparatus safely.

The input/output unit of the maintenance apparatus stores rules limiting the operation on the equipment information decrypted by the decryption unit of the maintenance apparatus, and limits the operation on the equipment information decrypted by the decryption unit of the maintenance apparatus according to the stored rules. Accordingly, it is possible to manage the decrypted equipment information in the maintenance apparatus safely. Further, the input/output unit of the maintenance apparatus outputs the stored equipment information via animation, so that the operation on the industrial equipment that cannot be seen with the naked eye can be visually analyzed. The input/output unit of the maintenance apparatus outputs the stored equipment information using a timing chart, so that the operation of the industrial equipment that cannot be seen with the naked eye can be analyzed from the operational timing perspectives. Furthermore, the input/output unit of the maintenance apparatus outputs a plurality of items of stored equipment data to the output unit such that the individual items of data are overlaid on a timing chart. Thus, it is possible to compare the operation of multiple pieces of industrial equipment or the operation of a single piece of industrial equipment at different times.

The input/output unit of the maintenance apparatus generates event information indicating the contents of the operation carried out by the user of the maintenance apparatus on the equipment information outputted by the input/output unit of the maintenance apparatus. The communication unit of the maintenance apparatus transmits the event information generated by the input/output unit of the maintenance apparatus to the industrial equipment that transmitted the common key. The communication unit of the industrial equipment receives the event information transmitted by the maintenance apparatus to which the common key has been transmitted. The input/output unit of the industrial equipment outputs all or part of the event information received by the communication unit of the industrial equipment. Thus, the user of the industrial equipment can recognize the contents of the operation carried out by the user of the maintenance apparatus on the decrypted equipment information.

Because the input/output unit of the maintenance apparatus generates event information indicating that the cause of trouble has been identified by the user of the maintenance apparatus, the user of the industrial equipment can recognize whether or not the cause of trouble has been identified as a result of analysis. Because the input/output unit of the maintenance apparatus receives the grounds on the basis of which the user of the maintenance apparatus decided that a particular event is responsible for a trouble and stores the grounds in the event information, the user of the industrial equipment can recognize the grounds for decision on the cause of the trouble. Furthermore, because the input/output unit of the maintenance apparatus generates event information indicating that the common key stored in the decryption unit of the maintenance apparatus has been deleted by the user of the maintenance apparatus, the user of the industrial equipment can recognize the fact that the common key transmitted to the maintenance apparatus has been deleted. Because the input/output unit of the maintenance apparatus further generates event information indicating that the equipment information stored in the input/output unit of the maintenance apparatus has been deleted by the user of the maintenance apparatus, the user of the industrial equipment can recognize that the equipment information decrypted in the maintenance apparatus has been deleted.

The communication unit of the maintenance apparatus stores event transmission rules for the transmission of the event information generated by the input/output unit of the maintenance apparatus to the industrial equipment, and transmits the event information generated by the input/output unit of the maintenance apparatus to the industrial equipment in accordance with the stored event transmission rules. Thus the rules for the transmission of a particular item of event information can be changed in a flexible manner. The communication unit of the maintenance apparatus stores the event transmission rules concerning the transmission of the event information indicating the identification of the cause of trouble by the user of the maintenance apparatus to the industrial equipment that has transmitted the common key. Thus the user of the industrial equipment can recognize whether or not the cause of trouble has been identified as a result of analysis. Furthermore, the communication unit of the maintenance apparatus stores the event transmission rules concerning the transmission of the event information about the grounds based on which a particular event has been identified as the cause of a trouble to the industrial equipment that has transmitted the common key. Thus the user of the industrial equipment can recognize the grounds on which the decision about the cause of trouble is based. Further, the communication unit of the maintenance apparatus stores the event transmission rules concerning the transmission of the event information indicating that the common key stored in the decryption unit of the maintenance apparatus has been deleted by the user of the maintenance apparatus to the industrial equipment that transmitted the common key. Thus, the user of the industrial equipment can recognize the fact that the common key transmitted to the maintenance apparatus has been deleted.

The input/output unit of the maintenance apparatus stores the event transmission rules concerning the transmission of the event information indicating that the equipment information stored in the input/output unit of the maintenance apparatus has been deleted by the user of the maintenance apparatus to the industrial equipment that transmitted the common key. Thus the user of the industrial equipment can recognize the fact that the equipment information decrypted in the maintenance apparatus has been deleted.

The maintenance apparatus includes a registration unit for registering the information identifying the industrial equipment, the encrypted equipment information used in identifying the cause of trouble, and a method of dealing with the trouble, in a mutually related manner. The input/output unit of the maintenance apparatus outputs a method of dealing with the trouble by referring to the registration unit, so that the users of the maintenance apparatus can share the knowledge about the method of analyzing the cause of trouble.

Various other modifications can be made to the invention. A second embodiment, which is a modification of the first embodiment, will be described below.

In the first embodiment the equipment information stored in each item of industrial equipment can be safely disclosed to maintenance personnel to the extent permitted by the user of the industrial equipment. In the second embodiment, the disclosure of the equipment information stored in each item of industrial equipment and the safety of the equipment information can be centrally managed by a managing apparatus. While in the system according to the second embodiment the configuration of the semiconductor manufacture/inspection equipment 123 and that of the managing apparatus 122 provided in the manufacturing factory 120 have been changed, the configuration of the maintenance apparatus 113 and that of the managing apparatus 112 provided in the maintenance center 110 are similar to those in the first embodiment.

Figure 19:
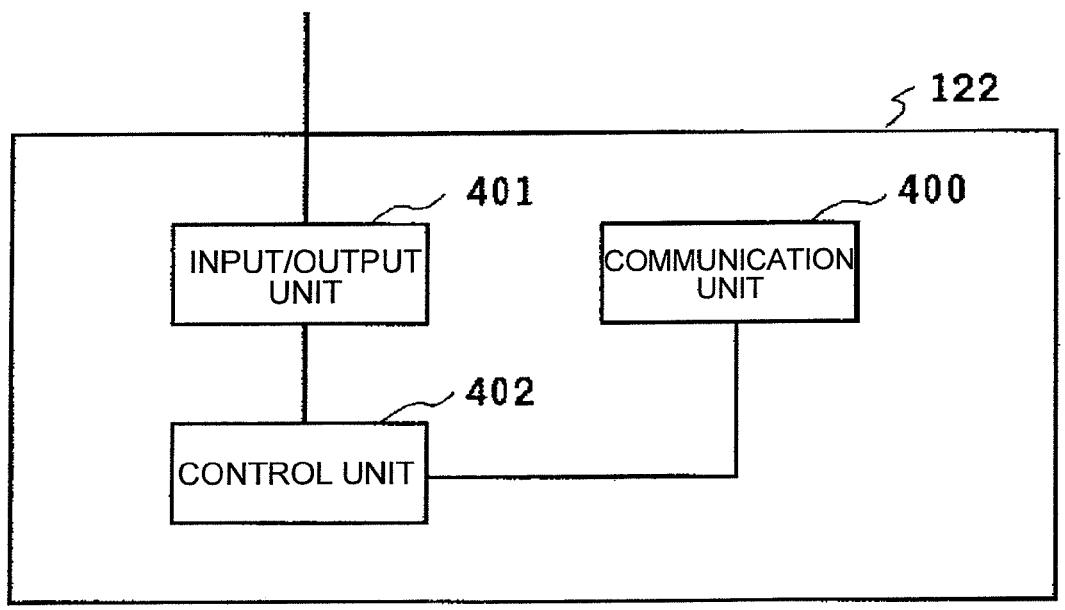
FIG. 19 shows a block diagram of a managing apparatus installed in a manufacturing factory.

FIG. 19 shows a block diagram of the managing apparatus 122 provided at the manufacturing factory 120. The managing apparatus 122 centrally manages the equipment data stored in each piece of the semiconductor manufacture/inspection equipment 123 provided at the manufacturing factory 120. The managing apparatus 122 is comprised of an input/output unit 400 for outputting data indicating the state of analysis to the user of the managing apparatus 122, a communication unit 401 for transmitting and receiving messages between the managing apparatus 112 and the semiconductor manufacture/inspection equipment 123, and a control unit 402 for controlling the input/output unit 400 and the communication unit 401.

The input/output unit 400 has the function of outputting the data that has been recorded since the reception of an analysis start notice to the reception of an analysis completion notice to the output unit.

The communication unit 401 periodically monitors the state of operation of the semiconductor manufacture/inspection equipment 123. Upon detection of a trouble, the communication unit 401 generates a maintenance request in which the equipment ID of the semiconductor manufacture/inspection equipment 123 and the error code of the trouble are stored and transmits it to the managing apparatus 122 of the maintenance center 110.

The communication unit 401, upon reception of a maintenance operation transmitted from the maintenance apparatus 113 in response to the maintenance request, transmits to the semiconductor manufacture/inspection equipment 123 where the trouble has taken place. The communication unit 401, upon reception of a maintenance operation response from the semiconductor manufacture/inspection equipment 123 in response to the maintenance operation, generates data to be transmitted to the semiconductor manufacture/inspection equipment 123 which has transmitted the maintenance operation, using the data stored in the received maintenance operation response. The communication unit 401 then transmits the maintenance operation response in which the generated data is stored to the maintenance apparatus 113 that transmitted the maintenance operation.

The communication unit 401, when the maintenance operation response transmitted from the semiconductor manufacture/inspection equipment 123 is a reading operation response, generates an equipment data ID, a common key, a common-key disclosure condition, and event transmission rules with regard to the equipment data stored in the maintenance operation response. The communication unit 401 then registers these items of data in a common-key managing table in a mutually related manner, and encrypts the equipment data stored in the maintenance operation response using the registered common key. The communication unit 401 then stores an equipment data package including the thus generated equipment data ID, encrypted equipment data, and event transmission rules in the maintenance operation response. The event transmission rules may be encrypted using the common key with which the equipment data has been encrypted.

When the maintenance operation response transmitted from the semiconductor manufacture/inspection equipment 123 is a solving operation response, the communication unit 401 stores the message data stored in the maintenance operation response in a maintenance operation response. The communication unit 401 also has the function of registering the maintenance personnel attributes indicating the attributes of a maintenance worker in a maintenance personnel attribute managing table. The data stored in the maintenance personnel attributes includes a maintenance personnel password and a maintenance personnel type. The maintenance personnel attributes are input by the user in advance.

The communication unit 401, upon reception of an analysis start notice from the maintenance apparatus 113, verifies the maintenance worker by comparing the password stored in the analysis start notice and that stored in the maintenance personnel attribute managing table. By this verification, the maintenance worker is identified by a unique identifier.

The communication unit 401, upon reception of an analysis start notice from the maintenance apparatus 113, searches the common-key managing table for a common-key disclosure condition, using the equipment data ID stored in the analysis start notice as a key. The communication unit 401 then searches the common-key managing table for the common key only when the common-key disclosure condition is satisfied by the maintenance worker's attributes. The communication unit 401 then transmits an analysis start notice response in which the retrieved common key is stored to the maintenance apparatus 113 that transmitted the analysis start notice.

The communication unit 401, upon reception of the messages of analysis start notice, analysis operation notice, and analysis completion notice from the maintenance apparatus 113, records the data stored in each message in the analysis-state managing table. The communication unit 401, upon reception of an analysis completion notice from the maintenance apparatus 113, requests an input/output unit 400, via the control unit 402, that it refer the analysis-state managing table for the data that has been recorded since the reception of the analysis start notice until the reception of the analysis completion notice and transmit the data to the output unit.

The semiconductor manufacture/inspection equipment 123 provided at the manufacturing factory 120 includes an input/output unit 130 that is used by the user in entering manufacturing operation, a communication unit 131 for receiving maintenance operation from the managing apparatus 122, a control unit 132 for executing programs in accordance with the received maintenance operation, and a part 134 controlled by the control unit 132. The control unit 132 and the part 134 are similar to those described with reference to the first embodiment. Therefore, in the following, the input/output unit 130 and the communication unit 131 will be described in detail.

The input/output unit 130, upon reception of manufacturing operation entered by the user, transmits a command in which a program ID designated by the entered manufacturing operation and parameters given to the program are stored to the control unit 132. Upon reception of a command response from the control unit 132 in which the result of execution of the program is stored, the input/output unit 130 extracts the program execution results from the received command response and outputs them to the output unit.

The communication unit 131 periodically monitors the state of operation of the semiconductor manufacture/inspection equipment 123. Upon detection of a trouble, the communication unit 131 generates a maintenance request in which the equipment ID of the semiconductor manufacture/inspection equipment 123 and the error code for the trouble are stored, and transmits the request via the managing apparatus 122 to the managing apparatus 112 of the maintenance center 110. The communication unit 131, upon reception of maintenance operation transmitted from the maintenance apparatus 113 in response to the maintenance request, generates a command in which the program ID and parameters stored in the received maintenance operation are stored, and transmits the command to the control unit 132. The communication unit 131, upon reception of a command response transmitted from the control unit 132 in response to the command, transmits a maintenance operation response in which the received command response is stored to the managing apparatus 122.

As the structure of the equipment data package, managing table and messages, as well as the output window, are similar to those described with reference to the first embodiment, they are not described herein.

The process flow of the managing apparatus 122 as it receives or transmits the analysis start notice, analysis start notice response, analysis operation notice, and analysis completion notice is similar to that of the semiconductor manufacture/inspection equipment 123 described with reference to the first embodiment and, therefore, is not described herein.

Thus, the on-line diagnostics system according to the present embodiment comprises one or more pieces of industrial equipment for performing specific processes, a managing apparatus for managing information transmitted from the industrial equipment, and a maintenance apparatus for the maintenance of the industrial equipment, which are connected by the Internet. The industrial equipment includes a communication unit for transmitting equipment information indicating the state of the industrial equipment to the managing apparatus. The managing apparatus includes an encryption unit, a communication unit, and an input/output unit. The encryption unit encrypts the equipment information transmitted by the industrial equipment using a predetermined common key. The communication unit transmits the encrypted equipment information encrypted by the encryption unit to the maintenance apparatus in response to a request therefrom, and transmits the common key used in encrypting the equipment information to the maintenance apparatus that received the encrypted equipment information, in response to a request therefrom. The input/output unit outputs all or part of the history of transmission of the common key from the managing apparatus to the maintenance apparatus. The maintenance apparatus includes a communication unit, a decryption unit, and an input/output unit. The communication unit receives the encrypted equipment information transmitted by the communication unit of the managing apparatus and receives the common key used in encrypting the encrypted equipment information from the managing apparatus after requesting it therefrom. The decryption unit stores the common key received by the communication unit of the maintenance apparatus, and decrypts the encrypted equipment information using the stored common key. The input/output unit stores the equipment information decrypted by the decryption unit, and then outputs all or part of the stored equipment information.

Thus, the disclosure of the equipment information stored in each piece of industrial equipment and the safety of the equipment information can be centrally managed by the managing apparatus.

The input/output unit of the managing apparatus outputs the encrypted equipment information to a memory medium. The input/output unit of the maintenance apparatus receives the encrypted equipment information from the memory medium. Thus, the encrypted equipment information can be inputted to the maintenance apparatus using a desired medium.

The communication unit of the managing apparatus encrypts the common key using a public key associated with the maintenance apparatus. The communication unit of the maintenance apparatus decrypts the common key received from the communication unit of the industrial equipment using a secret key associated with the public key. Thus the common key can be safely transmitted to the maintenance apparatus. Further, the communication unit of the managing apparatus carries attribute information indicating the attributes of the user of the maintenance apparatus and condition information indicating conditions about the attributes of the user of the maintenance apparatus that must be followed when transmitting the common key. When the common key is requested by the maintenance apparatus, the communication unit of the managing apparatus reads the user attribute information and the condition information about the common key, and transmits the common key to the maintenance apparatus only when the condition in the condition information that has been read is met by the attributes in the attribute information that has been read. Thus, the common key can be transmitted exclusively to a particular user of the maintenance apparatus.

The decryption unit of the maintenance apparatus stores rules limiting the use of the common key received by the communication unit of the maintenance apparatus, and limits the use of the common key received by the communication unit of the maintenance apparatus according to the stored rules. Thus, the common key can be safely managed in the maintenance apparatus.

The input/output unit of the maintenance apparatus stores rules limiting the use of the equipment information decrypted by the decryption unit of the maintenance apparatus, and limits the use of the equipment information decrypted by the decryption unit of the maintenance apparatus according to the stored rules. Thus, the decrypted equipment information can be safely managed in the maintenance apparatus. Further, as the input/output unit of the maintenance apparatus outputs the stored equipment information via animation, the operation of the industrial equipment that cannot be seen with the naked eye can be visually analyzed. The input/output unit of the maintenance apparatus can also output the stored equipment information via a timing chart, so that the operation of the industrial equipment that cannot be seen with the naked eye can be analyzed from the viewpoint of operational timing.

Further, the input/output unit of the maintenance apparatus can output the stored equipment data about a plurality of pieces of equipment data to the output unit such that the data items are overlaid on a timing chart. This makes it possible to compare the operation of a plurality of pieces of industrial equipment, or the operation of a single piece of industrial equipment over different times.

The input/output unit of the maintenance apparatus generates event information indicating the contents of the operation carried out by the user of the maintenance apparatus on the equipment information outputted by the input/output unit of the maintenance apparatus. The communication unit of the maintenance apparatus transmits the event information generated by the input/output unit of the maintenance apparatus to the managing apparatus that transmitted the common key. The communication unit of the managing apparatus receives the event information transmitted by the maintenance apparatus to which the common key has been transmitted. The input/output unit of the managing apparatus outputs all or part of the event information received by the communication unit of the managing apparatus. Thus, the user of the managing apparatus can recognize the contents of the operation carried out by the user of the maintenance apparatus on the decrypted equipment information. Further, the input/output unit of the maintenance apparatus generates event information indicating that the cause of the trouble has been identified by the user of the maintenance apparatus. This makes it possible for the user of the managing apparatus to recognize whether or not the cause of the trouble has been identified as a result of analysis.

The input/output unit of the maintenance apparatus receives the grounds based on which the user of the maintenance apparatus decided that a particular event is the cause of trouble, and stores the received grounds in the event information. Thus, the user of the managing apparatus can recognize the grounds for the decision on the cause of trouble. Further, the input/output unit of the maintenance apparatus generates event information indicating that the common key stored in the decryption unit of the maintenance apparatus has been deleted by the user of the maintenance apparatus. Thus, the user of the managing apparatus can recognize the deletion of the common key that has been transmitted to the maintenance apparatus. Further, the input/output unit of the maintenance apparatus generates event information indicating that the equipment information stored in the input/output unit of the maintenance apparatus has been deleted by the user of the maintenance apparatus. The user of the managing apparatus can therefore recognize the fact that the equipment information decrypted in the maintenance apparatus has been deleted.

The communication unit of the maintenance apparatus stores rules concerning the transmission of the event information generated by the input/output unit of the maintenance apparatus to the managing apparatus, and transmits the event information generated by the input/output unit of the maintenance apparatus to the managing apparatus according to the stored rules. Thus, the rules concerning the transmission of particular event information can be flexibly changed. Further, the communication unit of the maintenance apparatus stores event transmission rules concerning the transmission of the event information indicating that the cause of trouble has been identified by the user of the maintenance apparatus to the managing apparatus that transmitted the common key. Accordingly, the user of the managing apparatus can recognize whether or not the cause of trouble has been identified as a result of analysis. Furthermore, the communication unit of the maintenance apparatus stores event transmission rules concerning the transmission of the event information indicating the grounds on the basis of which a particular event has been identified as the cause of trouble to the managing apparatus from which the common key has been received. Thus, the user of the managing apparatus can recognize the grounds on which the decision about the cause of trouble is based. The communication unit of the maintenance apparatus stores event transmission rules concerning the transmission of event information indicating that the common key stored in the decryption unit of the maintenance apparatus has been deleted by the user of the maintenance apparatus to the managing apparatus that transmitted the common key. This makes it possible for the user of the managing apparatus to recognize the fact that the common key that has been transmitted to the maintenance apparatus has been deleted.

The input/output unit of the maintenance apparatus stores event transmission rules concerning the transmission of the event information indicating that the equipment information stored in the input/output unit of the maintenance apparatus has been deleted by the user of the maintenance apparatus to the managing apparatus that transmitted the common key. Thus, the user of the managing apparatus can recognize the fact that the equipment information decrypted in the maintenance apparatus has been deleted.

The maintenance apparatus includes a registration unit in which the information identifying the industrial equipment, the encrypted equipment information used in identifying the cause of trouble, and a method of dealing with the trouble are registered in a mutually related manner. The input/output unit of the maintenance apparatus outputs the method of dealing with the particular trouble by referring to the registration unit. Thus, the users of the maintenance apparatus can share the knowledge about the method of analyzing the cause of trouble.

Figure 20:
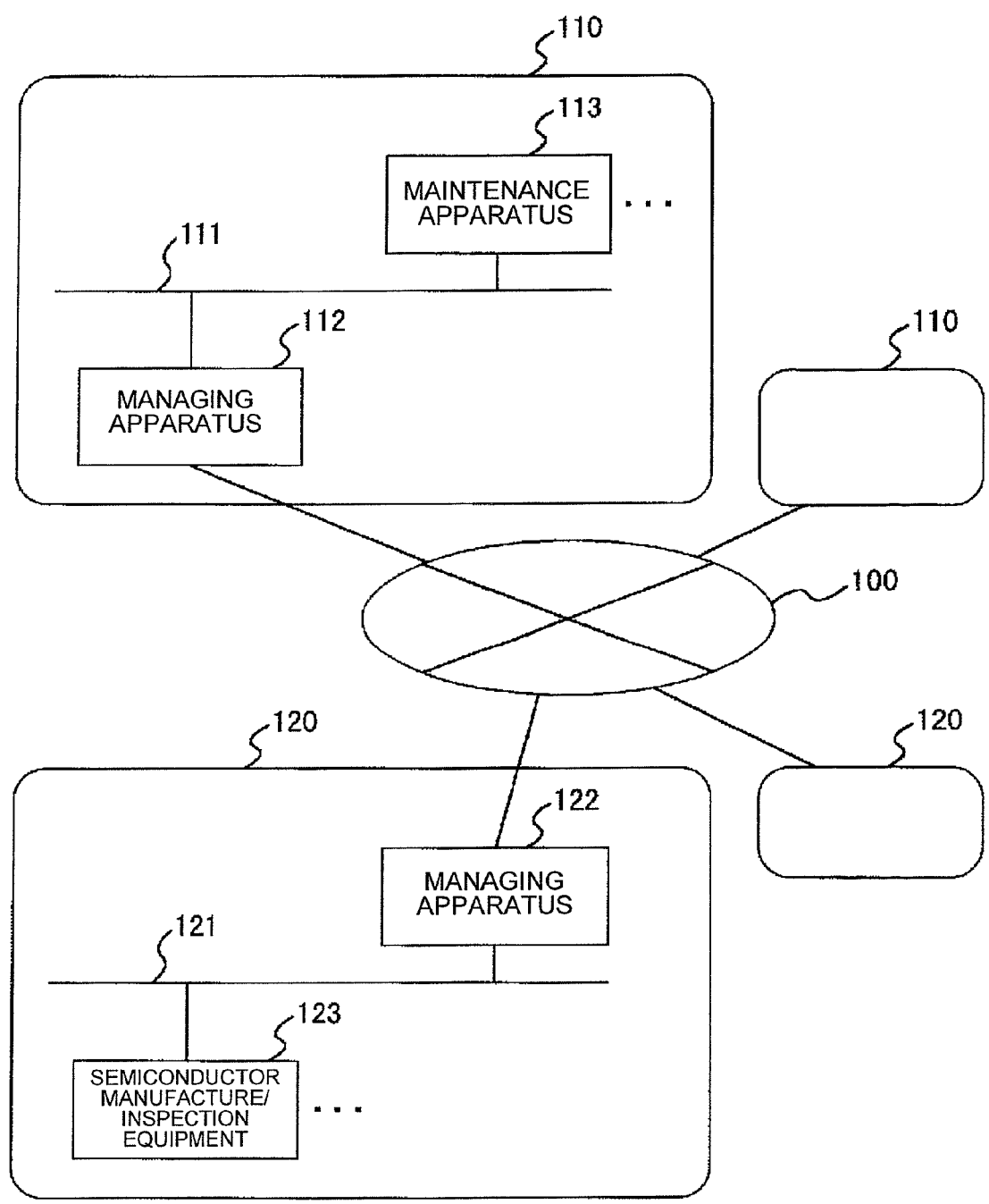
FIG. 20 shows a system block diagram of a third embodiment of the invention.

Hereafter a third embodiment of the invention will be described. FIG. 20 shows a block diagram of an on-line diagnostics system for semiconductor manufacture/inspection equipment to which the invention is applied. In the first embodiment, a plurality of manufacturing factories at which semiconductor manufacture/inspection equipment is installed and a maintenance center at which a maintenance apparatus is installed are connected via the Internet. In the first embodiment, the equipment information stored in each piece of the industrial equipment can be safely disclosed to maintenance personnel to the extent permitted by the user of the industrial equipment. In the third embodiment, a manufacturing factory at which semiconductor manufacture/inspection equipment is installed and a plurality of maintenance centers at which maintenance apparatus is installed are connected via the Internet. In this embodiment, equipment information stored in each piece of semiconductor manufacture/inspection equipment can be safely disclosed to maintenance personnel assigned to the semiconductor manufacture/inspection equipment where a trouble took place to the extent permitted by the user of the semiconductor manufacture/inspection equipment.

While the system shown in FIG. 20 includes two maintenance centers 110, there may be more than two maintenance centers in reality. The maintenance centers 110 may belong to different maintenance vendors, or they may belong to a single maintenance vendor.

While the system according to this embodiment has added a new function in the communication unit 131 of the semiconductor manufacture/inspection equipment 123 provided in the manufacturing factory 120, as will be described below, the other apparatuses are similar to those described with reference to the first embodiment.

The communication unit 131 of the semiconductor manufacture/inspection equipment 123 periodically monitors the state of operation of the semiconductor manufacture/inspection equipment 123. Upon detection of a trouble, the communication unit 131 selects one or more items of equipment data to be read from the semiconductor manufacture/inspection equipment 123 in accordance with a predetermined rule, and reads the selected equipment data. The communication unit 131 generates, with regard to each item of equipment data that has been read, an equipment data ID, a common key, and a common-key disclosure condition, and registers these items of data in a common-key managing table such that they are mutually related. The communication unit 131 encrypts each item of the equipment data that has been read using the generated common key, and generates an equipment data package comprising the generated equipment data ID, encrypted equipment data, and event transmission rules. The communication unit 131 also generates a maintenance request in which the equipment ID of the semiconductor manufacture/inspection equipment 123, the error code for the particular trouble, and one or more items of the generated equipment data are stored. The communication unit 131 also determines, according to predetermined rules, a maintenance center 110 to which the generated maintenance request is to be transmitted, and transmits the maintenance request to the managing apparatus 112 of the maintenance center 110 that has been determined.

The rules by which the communication unit 131 determines the maintenance apparatus to which the maintenance request is transmitted may vary. For example, some rules may require that information about the quality of maintenance work that can be provided by each maintenance apparatus be stored in advance, so that the maintenance apparatus to which the maintenance request is transmitted can be determined based on the stored quality information. Alternatively, some rules may require that maintenance apparatus candidates to which the maintenance request is transmitted be selected based on the quality information, so that the maintenance request can be transmitted to the maintenance apparatus selected by the user of the semiconductor manufacture/inspection equipment.

The maintenance apparatus 113 that received the maintenance request from the communication unit 131 stores the maintenance request in a file in an external memory unit designated by the maintenance worker, as when receiving a reading operation response, and then displays each equipment data package stored in the stored maintenance request.

Figures 21, 22:
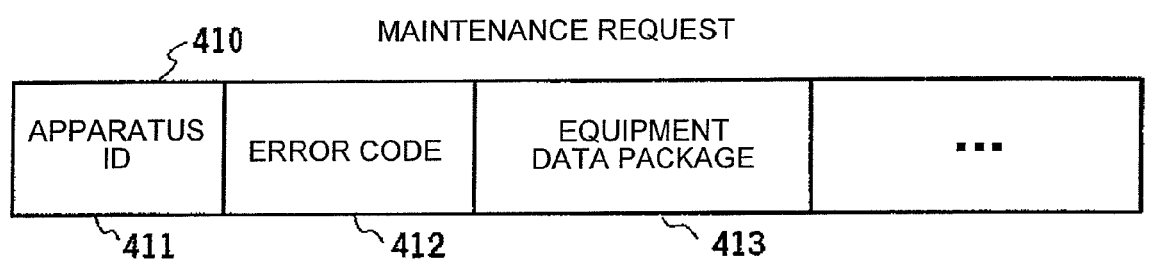
FIG. 21 shows the structure of maintenance request data transmitted and received between the managing apparatus installed in the semiconductor manufacturing factory and a maintenance apparatus at a maintenance center.
FIG. 22 shows the structure of an analysis-state managing table.

Hereafter, the structure of the maintenance request transmitted from the semiconductor manufacture/inspection equipment 123 to the maintenance apparatus 113 will be described. FIG. 21 shows an example of the data structure of the maintenance request. A maintenance request 410 is a message transmitted from the semiconductor manufacture/inspection equipment 123 to the maintenance apparatus 113 when requesting maintenance. The message is comprised of an equipment ID 411, an error code 412, an equipment data package 413, ..., and so on. There may be more than one item in the equipment data package 413.

The equipment ID 411 stores data identifying the semiconductor manufacture/inspection equipment 123 in which a trouble has been detected. The error code 412 stores data indicating the nature of the trouble. The equipment data package 413 stores an equipment data package used in analyzing the cause of the trouble. To the maintenance request may be added the date of detection of trouble, an ID for the semiconductor manufacturing factory, or the type of the semiconductor manufacture/inspection equipment, for example.

FIG. 22 shows an analysis-state managing table similar to the one shown in FIG. 6, except that amounts of countervalue are added that are calculated based on the contents of maintenance. The amounts are transmitted from the managing apparatus 112 of the maintenance center 110 to the managing apparatus 122 of the semiconductor manufacturing factory 120, where the amounts are confirmed and paid.

Each row of the analysis-state managing table 420 is comprised of an analysis work ID 421, an equipment data ID 422, a recorded date 423, a maintenance personnel type 424, a maintenance personnel ID 425, contents 426, and an amount 427. The analysis work ID 421 stores data identifying the analysis work. The equipment data ID 422 stores data identifying the equipment data that has been analyzed. The recording date 423 stores data indicating the date on which the history is recorded. The maintenance personnel type 424 stores data indicating the type of the maintenance worker who did the analysis work. The maintenance personnel ID 425 stores data identifying the analysis worker who did the analysis work. The contents 426 stores data indicating the contents of an analysis start notice, an analysis operation, and an analysis completion notice. The amounts 427 stores the amount of countervalue calculated in accordance with the contents of analysis.

Figure 23:
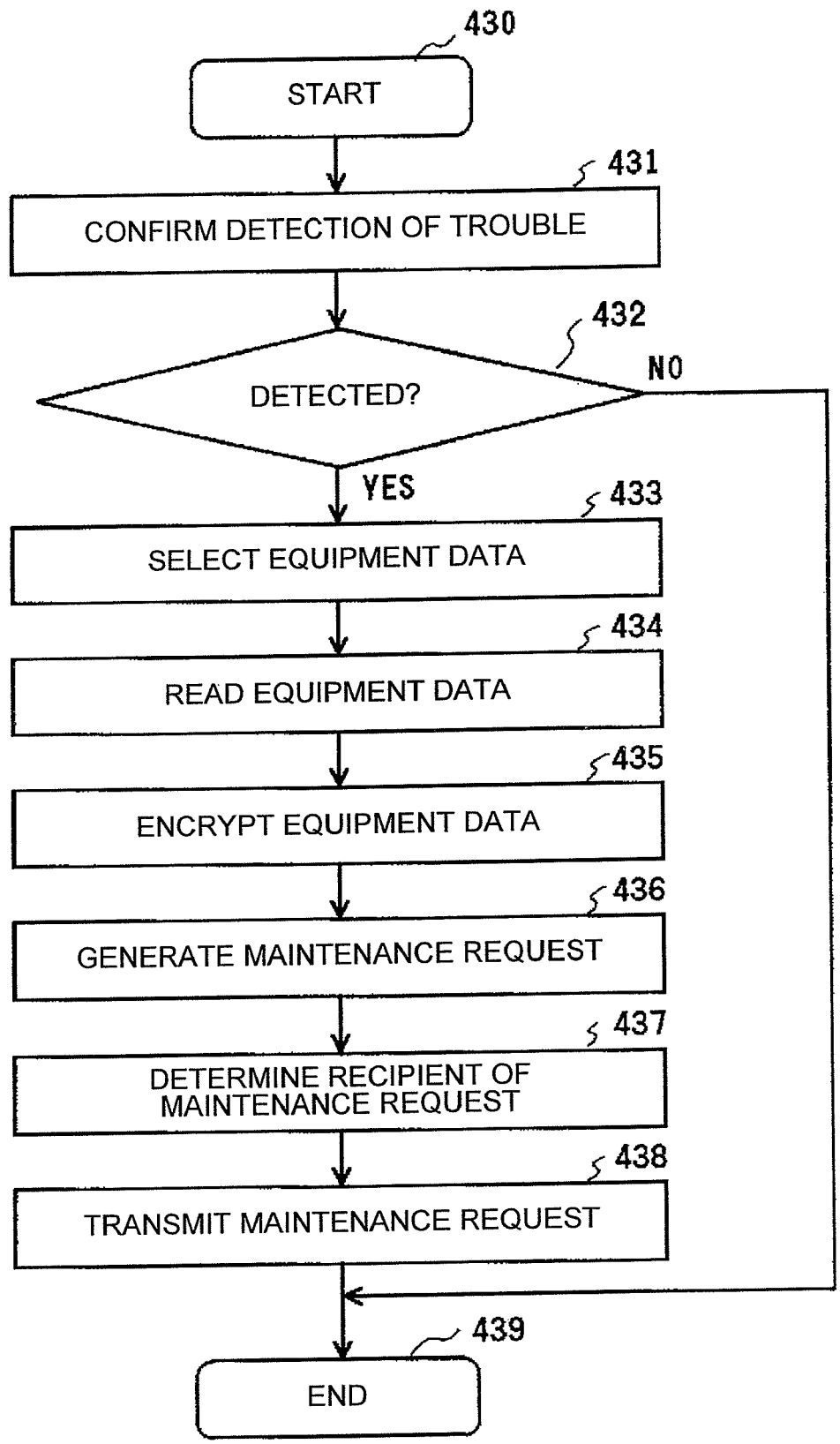
FIG. 23 shows a flowchart of the operation of a communication unit of the semiconductor manufacture/inspection equipment when receiving a maintenance request.

Hereafter, a process flow concerning the maintenance of the semiconductor manufacture/inspection equipment 123 shown in FIG. 20 will be described. FIG. 23 shows a flowchart of the operation that is carried out when a maintenance request is transmitted from the semiconductor manufacture/inspection equipment 123 to the maintenance apparatus 113. The communication unit 131 periodically carries out the processes described in this flowchart, thus periodically monitoring the state of operation of the semiconductor manufacture/inspection equipment 123.

First, the communication unit 131 determines whether or not a trouble has been detected in the semiconductor manufacture/inspection equipment 123 (steps 431 and 432). If a trouble is detected, the communication unit selects, in accordance with predetermined rules, equipment data to be read from the semiconductor manufacture/inspection equipment 123 (step 433). If no trouble is detected, the process comes to an end (step 439).

When a trouble is detected, the communication unit 131 reads one or more selected items of equipment data (step 434). The communication unit 131 then generates, with regard to each item of equipment data that has been read, an equipment data ID, a common key, and a common-key disclosure condition, and then registers these items of data in a common-key managing table in a mutually related manner (step 435). The communication unit 131 then generates a maintenance request in which the equipment ID for the semiconductor manufacture/inspection equipment 123, the error code for the trouble, and one or more generated equipment data packages are stored (step 436). Thereafter, the communication unit 131 determines a maintenance center 110 to which the generated maintenance request is to be transmitted, in accordance with predetermined rules (step 437). After the maintenance request is transmitted to the managing apparatus 112 of the maintenance center 110 that has been determined (step 438), the process comes to an end (step 439).

Thus in accordance with the system according to the present embodiment, an on-line diagnostics system comprises one or more pieces of industrial equipment for performing certain processes, and one or more maintenance apparatus for maintaining the industrial equipment, which are connected via the Internet. The industrial equipment includes an encryption unit, a determination unit, a communication unit, and an input/output unit. The encryption unit encrypts the equipment information indicating the state of the industrial equipment using a specific common key. The determination unit determines the maintenance apparatus to which the equipment information encrypted by the encryption unit is to be transmitted. The communication unit transmits the encrypted equipment information to the maintenance apparatus determined by the determination unit, and, in response to a request from the maintenance apparatus that received the encrypted equipment information, transmits the common key used in encrypting the equipment information. The input/output unit outputs all or part of the history of transmission of the common key from the industrial equipment to the maintenance apparatus. The maintenance apparatus includes a communication unit, a decryption unit, and an input/output unit. The communication unit receives the encrypted equipment information transmitted by the communication unit of the industrial equipment, requests the common key from the industrial equipment that has been used in encrypting the equipment information, and receives the common key. The decryption unit stores the common key received by the communication unit of the maintenance apparatus, and decrypts the encrypted equipment information using the stored common key. The input/output unit stores the equipment information decrypted by the decryption unit, and then outputs all or part of the stored equipment information.

Thus, the equipment information stored in each piece of industrial equipment can be safely disclosed to the maintenance worker dealing with the industrial equipment where trouble took place, to the extent permitted by the user of the industrial equipment.

Further, the determination unit of the industrial equipment stores quality information indicating the quality of the maintenance work that can be provided by each maintenance apparatus. The determination unit then determines, based on the stored quality information, one or more maintenance apparatus to which a maintenance request requesting maintenance is to be transmitted. The communication unit of the industrial equipment then transmits the maintenance request and the encrypted equipment information to the maintenance apparatus determined by the determination unit of the industrial equipment. Thus, it is possible to request maintenance depending on the quality of maintenance work that can be provided by each maintenance apparatus.

Further, the determination unit of the industrial equipment generates at least one maintenance apparatus candidate to which a maintenance request is to be transmitted. The input/output unit of the industrial equipment then outputs the candidate(s) generated by the determination unit of the industrial equipment. The determination unit of the industrial equipment then determines the maintenance apparatus selected by the user of the industrial equipment from among the candidate(s) outputted by the input/output unit of the industrial equipment, as the maintenance apparatus to which the maintenance request is to be transmitted. Thus, it is possible to request maintenance flexibly in accordance with the decision of the user of the industrial equipment.

The invention can be further embodied variously in addition to the above-described third embodiment. A fourth embodiment is a modification of the third embodiment. In the third embodiment, the equipment information stored in each item of industrial equipment can be safely disclosed to the maintenance worker dealing with the industrial equipment where a trouble took place, to the extent permitted by the user of the industrial equipment. In the fourth embodiment, the disclosure of the equipment information stored in each piece of industrial equipment to the maintenance worker in charge and the safety of the equipment information can be centrally managed by a managing apparatus. The system according to the present embodiment has added a new function to the managing apparatus 122 provided at the manufacturing factory 120, as will be described later. However, other apparatus are similar to those described with reference to the third embodiment.

Referring to FIG. 19, a communication unit 401 of the managing apparatus 122 periodically monitors the state of operation of the semiconductor manufacture/inspection equipment 123. Upon detection of a trouble, the communication unit 401 selects, in accordance with predetermined rules, equipment data to be read from the semiconductor manufacture/inspection equipment 123, and then transmits a reading operation to the semiconductor manufacture/inspection equipment 123 for reading the equipment data.

The communication unit 401, upon reception of each reading operation response transmitted from the semiconductor manufacture/inspection equipment 123 in response to the reading operation, generates an equipment data ID, a common key, and a common-key disclosure condition with regard to the equipment data stored in the received reading operation response. The communication unit 401 registers these items of data in a common-key managing table in a mutually related manner.

The communication unit 401 encrypts the equipment data stored in the reading operation response using the generated common key. The communication unit 401 then generates an equipment data package comprised of the generated equipment data ID, the encrypted equipment data, and event transmission rules. The communication unit 401 also generates a maintenance request in which an equipment ID for the semiconductor manufacture/inspection equipment 123, an error code for the trouble, and one or more equipment data packages are stored.

The communication unit 401 also determines an equipment vendor to which the generated maintenance request is to be transmitted, and then transmits the maintenance request to the managing apparatus 112 of the thus determined equipment vendor.

The rules by which the communication unit 401 selects the maintenance apparatus to which the maintenance request is transmitted may vary. For example, some rules may require that information about the quality of the maintenance work that can be provided by each maintenance apparatus be stored in advance, so that the maintenance apparatus to which the maintenance request is transmitted can be determined based on the stored quality information. Alternatively, some rules may require that maintenance apparatus candidates to which the maintenance request is transmitted be selected based on the quality information, so that the maintenance request can be transmitted to the maintenance apparatus selected by the user of the managing apparatus from among the candidates.

The maintenance apparatus 113 that received the maintenance request from the communication unit 131 stores the maintenance request in a file in the external memory unit designated by the maintenance worker, as when receiving a reading operation response, and then displays each equipment data package stored in the stored maintenance request.

The structure of the maintenance request transmitted from the managing apparatus 122 to the maintenance apparatus 113 is the same as that described with reference to the third embodiment and, therefore, is not described.

The operation of the managing apparatus 122 when transmitting a maintenance request to the maintenance apparatus 113 is the same as that of the semiconductor manufacture/ inspection equipment 123 described with reference to the third embodiment and, therefore, is not described.

Thus, in accordance with the present embodiment, the system comprises one or more pieces of industrial equipment for carrying out specific processes, a managing apparatus for managing information transmitted from the industrial equipment, one or more maintenance apparatus for maintaining the industrial equipment and the Internet connecting these apparatus and equipment. The industrial equipment includes a communication unit for transmitting the equipment information indicating the state of the industrial equipment to the managing apparatus. The managing apparatus includes an encryption unit, a determination unit, a communication unit, and an input/output unit. The encryption unit encrypts the equipment information transmitted by the communication unit of the industrial equipment, using a specific common key. The determination unit determines the maintenance apparatus to which the equipment information encrypted by the encryption unit is transmitted. The communication unit transmits the encrypted equipment information to the maintenance apparatus determined by the determination unit and, in response to a request from the maintenance apparatus that received the encrypted equipment information, transmits the common key used in encrypting the equipment information. The input/output unit outputs all or part of the history of transmission of the common key from the managing apparatus to the maintenance apparatus. The maintenance apparatus includes a communication unit, a decryption unit, and an input/output unit. The communication unit receives the encrypted equipment information transmitted from the communication unit of the managing apparatus, requests the common key from the managing apparatus that was used in encrypting the equipment information, and receives the common key. The decryption unit stores the common key received by the communication unit of the maintenance apparatus, and then decrypts the encrypted equipment information using the stored common key. The input/output unit stores the equipment information decrypted by the decryption unit, and then outputs all or part of the stored equipment information.

Thus, it is possible to centrally manage the disclosure of the equipment information stored in each piece of industrial equipment to the maintenance worker in charge and the safety of the equipment information by the managing apparatus.

The determination unit of the managing apparatus stores quality information indicating the quality of the maintenance work that can be provided by each maintenance apparatus, and determines, based on the stored quality information, one or more maintenance apparatus to which a maintenance request is to be transmitted. The communication unit of the managing apparatus then transmits the maintenance request and the encrypted equipment information to the maintenance apparatus determined by the determination unit of the managing apparatus. Thus, maintenance can be requested depending on the attributes of the maintenance work that can be provided by each maintenance apparatus.

Further, the determination unit of the managing apparatus generates at least one maintenance apparatus candidate to which a maintenance request is to be transmitted. The input/output unit of the managing apparatus outputs the candidate generated by the determination unit of the managing apparatus. The determination unit of the managing apparatus then determines the maintenance apparatus selected by the user of the managing apparatus from among the candidate(s) outputted by the input/output unit of the managing apparatus, as the maintenance apparatus to which a maintenance request is to be transmitted. Thus, maintenance can be requested depending on the decision of the user of the managing apparatus flexibly.

The features of the individual embodiments of the invention are described below.

(1) An on-line diagnostics system comprising one or more pieces of industrial equipment for performing specific processes, and a maintenance apparatus for maintaining the industrial equipment, which are connected via the Internet, wherein the industrial equipment comprises:

an encryption unit for encrypting equipment information indicating the state of the industrial equipment, using a specific common key;

a communication unit for transmitting the encrypted equipment information encrypted by the encryption unit to the maintenance apparatus in response to a request therefrom, and transmitting the common key used in encrypting the equipment information to the maintenance apparatus that received the encrypted equipment information, in response to a request therefrom; and an input/output unit for outputting all or part of the history of transmission of the common key from the industrial equipment to the maintenance apparatus, the maintenance apparatus comprises:

a communication unit for receiving the encrypted equipment information transmitted by the communication unit of the industrial equipment and for receiving the common key used in encrypting the equipment information from the industrial equipment after requesting it therefrom;

a decryption unit for storing the common key received by the communication unit of the maintenance apparatus and for decrypting the encrypted equipment information using the stored common key; and an input/output unit for storing the equipment information decrypted by the decryption unit and for outputting all or part of the stored equipment information.

(2) The on-line diagnostics system according to (1), wherein the input/output unit of the industrial equipment outputs the encrypted equipment information to a memory medium, and wherein the input/output unit of the maintenance apparatus receives from the memory medium the encrypted equipment information outputted by the input/output unit of the industrial equipment.

(3) The on-line diagnostics system according to (1), wherein the communication unit of the industrial equipment encrypts the common key using an public key associated with the maintenance apparatus before transmitting it, and wherein the communication unit of the maintenance apparatus decrypts the common key received from the communication unit of the industrial equipment, using a secret key associated with the public key.

(4) The on-line diagnostics system according to (1), wherein the communication unit of the industrial equipment carries attribute information indicating the attributes of the user of the maintenance apparatus, and condition information indicating a condition concerning the attributes of the user of the maintenance apparatus that is required when transmitting the common key, wherein, when the common key is requested by the maintenance apparatus, the communication unit reads the attribute information about the user and the condition information about the common key, and transmits the common key to the maintenance apparatus only when the attributes in the attribute information that has been read satisfy the condition in the condition information that has been read.

(5) The on-line diagnostics system according to (1), wherein the decryption unit of the maintenance apparatus stores rules limiting the operation on the common key received by the communication unit of the maintenance apparatus, and limits the operation on the common key received by the communication unit of the maintenance apparatus according to the stored rules.

(6) The on-line diagnostics system according to (1), wherein the input/output unit of the maintenance apparatus stores rules limiting the operation on the equipment information decrypted by the decryption unit of the maintenance apparatus, and limits the operation on the equipment information decrypted by the decryption unit of the maintenance apparatus according to the stored rules.

(7) The on-line diagnostics system according to (1), wherein the input/output unit of the maintenance apparatus outputs the stored equipment information using animation.

(8) The on-line diagnostics system according to (1), wherein the input/output unit of the maintenance apparatus outputs the stored equipment information using a timing chart.

(9) The on-line diagnostics system according to (1), wherein the input/output unit of the maintenance apparatus outputs a plurality of items of equipment data that has been stored to an output unit such that the items of equipment data are overlaid on a timing chart.

(10) The on-line diagnostics system acceding to (1), wherein
the input/output unit of the maintenance apparatus generates event information indicating the contents of operation carried out by the user of the maintenance apparatus on the equipment information outputted by the input/output unit of the maintenance apparatus,
the communication unit of the maintenance apparatus transmits the event information generated by the input/output unit of the maintenance apparatus to the industrial equipment that transmitted the common key,
the communication unit of the industrial equipment receives the event information transmitted by the maintenance apparatus to which the common key has been transmitted, and
the input/output unit of the industrial equipment outputs all or part of the event information received by the communication unit of the industrial equipment.

(11) The on-line diagnostics system according to (10), wherein the input/output unit of the maintenance apparatus generates event information indicating that the cause of trouble has been identified by the user of the maintenance apparatus.

(12) The on-line diagnostics system according to (11), wherein the input/output unit of the maintenance apparatus receives the grounds based on which the user of the maintenance apparatus has decided that a particular event is the cause of trouble, and stores the received grounds in the event information.

(13) The on-line diagnostics system according to (11), wherein the input/output unit of the maintenance apparatus generates event information indicating that the common key stored in the decryption unit of the maintenance apparatus has been deleted by the user of the maintenance apparatus.

(14) The on-line diagnostics system according to (11), wherein the input/output unit of the maintenance apparatus generates event information indicating that the equipment information stored in the input/output unit of the maintenance apparatus has been deleted by the user of the maintenance apparatus.

(15) The on-line diagnostics system according to (10), wherein the communication unit of the maintenance apparatus stores event transmission rules for the transmission of the event information generated by the input/output unit of the maintenance apparatus to the industrial equipment, and limits the transmission of the event information generated by the input/output unit of the maintenance apparatus to the industrial equipment according to the stored rules.

(16) The on-line diagnostics system according to (15), wherein the communication unit of the maintenance apparatus stores event transmission rules by which the event information indicating the identification of the cause of trouble by the user of the maintenance apparatus is transmitted to the industrial equipment that transmitted the common key.

(17) The on-line diagnostics system according to (16), wherein the communication unit of the maintenance apparatus stores event transmission rules by which the event information indicating the grounds based on which a particular event has been determined to be the cause of trouble is transmitted to the industrial equipment that transmitted the common key.

(18) The on-line diagnostics system according to (15), wherein the communication unit of the maintenance apparatus stores event transmission rules by which event information indicating that the common key stored in the decryption unit of the maintenance apparatus has been deleted by the user of the maintenance apparatus is transmitted to the industrial equipment that transmitted the common key.

(19) The on-line diagnostics system according to (15), wherein the input/output unit of the maintenance apparatus stores event transmission rules by which event information indicating that the equipment information stored in the input/output unit of the maintenance apparatus has been deleted by the user of the maintenance apparatus is transmitted to the industrial equipment that transmitted the common key.

(20) The on-line diagnostics system according to (1), wherein the maintenance apparatus comprises a registration unit for registering information identifying the industrial equipment, the encrypted equipment information used in identifying the cause of trouble, and a method of dealing with the trouble in a mutually related manner, and wherein the input/output unit of the maintenance apparatus outputs a method of dealing with a particular trouble by referring to the registration unit.

(21) The on-line diagnostics system according to (1), wherein the industrial equipment is semiconductor manufacture/inspection equipment.

(22) Industrial equipment adapted to be maintained remotely by a maintenance apparatus connected via the Internet, comprising:
an encryption unit for encrypting equipment information indicating the state of the industrial equipment using a particular common key;
a communication unit for transmitting the encrypted equipment information encrypted by the encryption unit to the maintenance apparatus in response to a request therefrom, and for transmitting the common key used in encrypting the equipment information in response to a request from the maintenance apparatus that received the encrypted equipment information; and
an input/output unit for outputting all or part of the history of transmission of the common key from the industrial equipment to the maintenance apparatus.

(23) The industrial equipment according to (22), wherein the input/output unit outputs the encrypted equipment information to a memory medium before it is received by the maintenance apparatus.

(24) The industrial equipment according to (22), wherein the communication unit encrypts the common key using a public key associated with the maintenance apparatus before transmitting it.

(25) The industrial equipment according to (22), wherein the communication unit carries attribute information indicating the attributes of a user of the maintenance apparatus, and condition information indicating a condition about the attributes of the user of the maintenance apparatus which is required in transmitting the common key, wherein, when the common key is requested by the maintenance apparatus, the communication unit reads the user's attribute information and the condition information about the common key and transmits the common key to the maintenance apparatus only when the condition in the condition information that has been read is satisfied by the attributes in the attribute information that has been read.

(26) The industrial equipment according to (22), wherein the communication unit receives event information indicating the contents of operation performed by the user of the maintenance apparatus on the equipment information from the maintenance apparatus to which the common key has been transmitted, and wherein the input/output unit outputs all or part of the event information received by the communication unit.

(27) The on-line diagnostics system according to (26), wherein the communication unit receives event information indicating that the cause of trouble has been identified by the user of the maintenance apparatus.

(28) The on-line diagnostics system according to (27), wherein the communication unit receives event information indicating the grounds based on which the user of the maintenance apparatus has determined a particular event to be the cause of trouble.

(29) The industrial equipment according to (26), wherein the communication unit receives event information indicating that the common key stored in the maintenance apparatus has been deleted by the user of the maintenance apparatus.

(30) The industrial equipment according to (26), wherein the communication unit receives event information indicating that the equipment information stored in the maintenance apparatus has been deleted by the user of the maintenance apparatus.

(31) A maintenance apparatus for remotely maintaining industrial equipment connected via the Internet, comprising:

a communication unit for receiving encrypted equipment information indicating the state of the industrial equipment and encrypted by a specific common key from the industrial equipment, and for receiving the common key used in encrypting the encrypted equipment information from the industrial equipment after requesting it therefrom;

a decryption unit for storing the common key received by the communication unit, and for decrypting the encrypted equipment information using the stored common key; and an input/output unit for storing the equipment information decrypted by the decryption unit, and for outputting all or part of the stored equipment information.

(32) The maintenance apparatus according to (31), wherein the input/output unit receives from a memory medium the encrypted equipment information outputted by the industrial equipment.

(33) The maintenance apparatus according to (31), wherein the communication unit decrypts the common key received from the industrial equipment, using a secret key associated with the maintenance apparatus.

(34) The maintenance apparatus according to (31), wherein the decryption unit stores rules limiting the operation on the common key received by the communication unit, and limits the operation on the common key received by the communication unit according to the stored rules.

(35) The maintenance apparatus according to (31), wherein the input/output unit stores rules limiting the operation on the equipment information decrypted by the decryption unit, and limits the operation on the equipment information decrypted by the decryption unit according to the stored rules.

(36) The maintenance apparatus according to (31), wherein the input/output unit outputs the stored equipment information using animation.

(37) The maintenance apparatus according to (31), wherein the input/output unit outputs the stored equipment information using a timing chart.

(38) The maintenance apparatus according to (31), wherein the input/output unit outputs to the output unit a plurality of items of stored equipment data such that they are overlaid on a timing chart.

(39) The maintenance apparatus according to (31), wherein the input/output unit generates event information indicating the contents of operation performed by the user of the maintenance apparatus on the equipment information outputted by the input/output unit, and wherein the communication unit transmits the event information generated by the input/output unit to the industrial equipment that transmitted the common key.

(40) The maintenance apparatus according to (31), wherein the input/output unit generates event information indicating that the cause of trouble has been identified by the user of the maintenance apparatus.

(41) The maintenance apparatus according to (40), wherein the input/output unit receives the grounds based on which the user of the maintenance apparatus has determined a particular event to be the cause of trouble, and stores the grounds in the event information.

(42) The maintenance apparatus according to (31), wherein the input/output unit generates event information indicating that the common key stored in the decryption unit of the maintenance apparatus has been deleted by the user of the maintenance apparatus.

(43) The maintenance apparatus according to (31), wherein the input/output unit generates event information indicating that the equipment information stored in the input/output unit of the maintenance apparatus has been deleted by the user of the maintenance apparatus.

(44) The maintenance apparatus according to (31), wherein the communication unit stores rules for the transmission of the event information generated by the input/output unit to the industrial equipment, and transmits the event information generated by the input/output unit to the industrial equipment according to the stored rules.

(45) The maintenance apparatus according to (44), wherein the communication unit stores event transmission rules by which event information indicating that the cause of trouble has been identified by the user of the maintenance apparatus is transmitted to the industrial equipment that transmitted the common key.

(46) The maintenance apparatus according to (45), wherein the communication unit stores event transmission rules concerning the transmission of event information indicating the grounds based on which a particular event has been determined to be the cause of trouble to the industrial equipment that transmitted the common key.

(47) The maintenance apparatus according to (45), wherein the communication unit stores event transmission rules concerning the transmission of event information indicating that the common key stored in the decryption unit has been deleted by the user of the maintenance apparatus to the industrial equipment that transmitted the common key.

(48) The maintenance apparatus according to (45), wherein the input/output unit stores event transmission rules by which event information indicating that the equipment information stored in the input/output unit has been deleted by the user of the maintenance apparatus is transmitted to the industrial equipment that transmitted the common key.

(49) The maintenance apparatus according to (31), further comprising a registration unit in which information identifying the industrial equipment, the encrypted equipment information used in identifying the cause of trouble, and a method of dealing with trouble are stored in a mutually related manner, wherein the input/output unit outputs a method of dealing with the trouble by referring to the registration unit.

(50) An on-line diagnostics system comprising one or more pieces of industrial equipment for performing specific processes, a managing apparatus for managing information transmitted from the industrial equipment, and a maintenance apparatus for the maintenance of the industrial equipment, which are connected via the Internet, wherein the industrial equipment comprises a communication unit for transmitting equipment information indicating the state of the industrial equipment to the managing apparatus, the managing apparatus comprises an encryption unit for encrypting the equipment information transmitted from the industrial equipment, using a specific common key, a communication unit for transmitting the encrypted equipment information encrypted by the encryption unit to the maintenance apparatus in response to a request therefrom, and for transmitting the common key used in encrypting the encrypted equipment information in response to a request from the maintenance apparatus that received the encrypted equipment information, and an input/output unit for outputting all or part of the history of transmission of the common key from the managing apparatus to the maintenance apparatus, and the maintenance apparatus comprises a communication unit for receiving the encrypted equipment information transmitted by the communication unit of the managing apparatus, and for receiving the common key used in encrypting the encrypted equipment information from the managing apparatus after requesting it therefrom, a decryption unit for storing the common key received by the communication unit of the maintenance apparatus and for decrypting the encrypted equipment information using the stored common key, and an input/output unit for storing the equipment information decrypted by the decryption unit and for outputting all or part of the stored equipment information.

(51) The on-line diagnostics system according to (50), wherein the input/output unit of the managing apparatus outputs the encrypted equipment information to a memory medium, and the input/output unit of the maintenance apparatus receives from the memory medium the encrypted equipment information outputted by the input/output unit of the managing apparatus.

(52) The one-line diagnostics system according to (50), wherein the communication unit of the managing apparatus encrypts the common key using a public key associated with the maintenance apparatus before transmitting it, and the communication unit of the maintenance apparatus decrypts the common key received from the communication unit of the industrial equipment, using a secret key associated with the public key.

(53) The on-line diagnostics system according to (50), wherein the communication unit of the managing apparatus carries attribute information indicating the attributes of a user of the maintenance apparatus, and condition information indicating a condition concerning the attributes of the user of the maintenance apparatus which is necessary for the transmission of the common key, wherein, when the common key is requested by the maintenance apparatus, the communication unit reads the user's attribute information and the condition information about the common key, and transmits the common key to the maintenance apparatus only when the condition in the condition information that has been read is satisfied by the attributes in the attribute information that has been read.

(54) The on-line diagnostics system according to (50), wherein the decryption unit of the maintenance apparatus stores rules limiting the operation on the common key received by the communication unit of the maintenance apparatus, and limits the operation on the common key received by the communication unit of the maintenance apparatus according to the stored rules.

(55) The on-line diagnostics system according to (50), wherein the input/output unit of the maintenance apparatus stores rules limiting the operation on the equipment information decrypted by the decryption unit of the maintenance apparatus, and limits the operation on the equipment information decrypted by the decryption unit of the maintenance apparatus according to the stored rules.

(56) The on-line diagnostics system according to (50), wherein the input/output unit of the maintenance apparatus outputs the stored equipment information using animation.

(57) The on-line diagnostics system according to (50), wherein the input/output unit of the maintenance apparatus outputs the stored equipment information using a timing chart.

(58) The on-line diagnostics system according to (50), wherein the input/output unit of the maintenance apparatus outputs a plurality of items of stored equipment data to the output unit such that they are overlaid on a timing chart.

(59) The on-line diagnostics system according to (50), wherein the input/output unit of the maintenance apparatus generates event information indicating the contents of the operation performed by the user of the maintenance apparatus on the equipment information outputted by the input/output unit of the maintenance apparatus, the communication unit of the maintenance apparatus transmits the event information generated by the input/output unit of the maintenance apparatus to the managing apparatus that transmitted the common key, and the communication unit of the managing apparatus receives the event information transmitted by the maintenance apparatus to which the common key has been transmitted, and the input/output unit of the managing apparatus outputs all or part of the event information received by the communication unit of the managing apparatus.

(60) The on-line diagnostics system according to (59), wherein the input/output unit of the maintenance apparatus generates event information indicating that the cause of trouble has been identified by the user of the maintenance apparatus.

(61) The on-line diagnostics system according to (59), wherein the input/output unit of the maintenance apparatus receives the grounds based on which the user of the maintenance apparatus has determined a particular event to be the cause of trouble, and stores the received grounds in the event information.

(62) The on-line diagnostics system according to (59), wherein the input/output unit of the maintenance apparatus generates event information indicating that the common key stored in the decryption unit of the maintenance apparatus has been deleted by the user of the maintenance apparatus.

(63) The on-line diagnostics system according to (59), wherein the input/output unit of the maintenance apparatus generates event information indicating that the equipment information stored in the input/output unit of the maintenance apparatus has been deleted by the user of the maintenance apparatus.

(64) The on-line diagnostics system according to (50), wherein the communication unit of the maintenance apparatus stores rules regarding the transmission of the event information generated by the input/output unit of the maintenance apparatus to the managing apparatus, and transmits the event information generated by the input/output unit of the maintenance apparatus to the managing apparatus in accordance with the stored rules.

(65) The on-line diagnostics system according to (64), wherein the communication unit of the maintenance apparatus stores event transmission rules regarding the transmission of event information indicating that the cause of trouble has been identified by the user of the maintenance apparatus to the managing apparatus that transmitted the common key.

(66) The on-line diagnostics system according to (64), wherein the communication unit of the maintenance apparatus stores event transmission rules regarding the transmission of event information indicating the grounds based on which the a particular event has been determined to be the cause of trouble to the managing apparatus that transmitted the common key.

(67) The on-line diagnostics system according to (64), wherein the communication unit of the maintenance apparatus stores event transmission rules regarding the transmission of event information indicating that the common key stored in the decryption unit of the maintenance apparatus has been deleted by the user of the maintenance apparatus to the managing apparatus that transmitted the common key.

(68) The on-line diagnostics system according to (64), wherein the input/output unit of the maintenance apparatus stores event transmission rules regarding the transmission of event information indicating that the equipment information stored in the input/output unit of the maintenance apparatus has been deleted by the user of the maintenance apparatus to the managing apparatus that transmitted the common key.

(69) The on-line diagnostics system according to (50), wherein the maintenance apparatus comprises a registration unit for registering information identifying the industrial equipment, the encrypted equipment information used in identifying the cause of trouble, and a method of dealing with trouble in a mutually related manner, and wherein the input/output unit of the maintenance apparatus outputs a method of dealing with trouble by referring to the registration unit.

(70) The on-line diagnostics system according to (50), wherein the industrial equipment is semiconductor manufacture/inspection equipment.

(71) A managing apparatus for managing information transmitted from one or more pieces of industrial equipment for performing specific processes, comprising:

an encryption unit for encrypting equipment information indicating the state of the industrial equipment using a specific common key;

a communication unit for transmitting the encrypted equipment information encrypted by the encryption unit to a maintenance apparatus connected via the Internet in response to a request therefrom, and for transmitting the common key used in encrypting the encrypted equipment information in response to a request from the maintenance apparatus that received the encrypted equipment information; and an input/output unit for outputting all or part of the history of transmission of the common key to the maintenance apparatus.

(72) The managing apparatus according to (71), wherein the input/output unit outputs to a memory medium the encrypted equipment information to be received by the maintenance apparatus.

(73) The managing apparatus according to (71), wherein the communication unit encrypts the common key using a public key associated with the maintenance apparatus before transmitting it.

(74) The managing apparatus according to (71), wherein the communication unit carries attribute information indicating the attributes of a user of the maintenance apparatus, and condition information indicating a condition concerning the attributes of the user of the maintenance apparatus which is necessary for the transmission of the common key, wherein, when the common key is requested by the maintenance apparatus, the communication unit reads the attribute information about the user of the maintenance apparatus and the condition information about the common key, and transmits the common key to the maintenance apparatus only when the condition in the condition information that has been read is satisfied by the attributes in the attribute information that has been read.

(75) The managing apparatus according to (71), wherein the communication unit receives event information from the maintenance apparatus to which the common key has been transmitted, the event information indicating the contents of operation performed by the user of the maintenance apparatus on the equipment information, and the input/output unit outputs all or part of the event information received by the communication unit.

(76) The managing apparatus according to (75), wherein the communication unit receives event information indicating that the cause of trouble has been identified by the user of the maintenance apparatus.

(77) The managing apparatus according to (75), wherein the communication unit receives event information indicating the grounds based on which the user of the maintenance apparatus has determined a particular event to be the cause of trouble.

(78) The managing apparatus according to (75), wherein the communication unit receives event information indicating that the common key stored in the maintenance apparatus has been deleted by the user of the maintenance apparatus.

(79) The managing apparatus according to (75), wherein the communication unit receives event information indicating that the equipment information stored in the maintenance apparatus has been deleted by the user of the maintenance apparatus.

(80) An on-line diagnostics system comprising one or more pieces of industrial equipment for performing specific processes, and one or more maintenance apparatus for the maintenance of the industrial equipment, which are connected via the Internet, wherein:

the industrial equipment comprises an encryption unit for encrypting equipment information indicating the state of the industrial equipment using a specific common key, a determination unit for determining a maintenance apparatus to which the encrypted equipment information encrypted by the encryption unit is to be transmitted, a communication unit for transmitting the encrypted equipment information encrypted by the encryption unit to the maintenance apparatus determined by the determination unit, and for transmitting the common key used in encrypting the encrypted equipment information in response to a request from the maintenance apparatus that received the encrypted equipment information, and an input/output unit for outputting all or part of the history of transmission of the common key from the industrial equipment to the maintenance apparatus, and wherein the maintenance apparatus comprises a communication unit for receiving the encrypted equipment information transmitted by the communication unit of the industrial equipment, and for receiving the common key used in encrypting the encrypted equipment information from the industrial equipment after requesting it therefrom, a decryption unit for storing the common key received by the communication unit of the maintenance apparatus and for decrypting the encrypted equipment information using the stored common key, and an input/output unit for storing the equipment information decrypted by the decryption unit and for outputting all or part of the stored equipment information.

(81) The on-line diagnostics system according to (80), wherein the determination unit of the industrial equipment stores quality information indicating the quality of maintenance work that can be provided by each maintenance apparatus, and determines one or more maintenance apparatus to which a maintenance request requesting maintenance is to be transmitted, based on the stored quality information, and wherein the communication unit of the industrial equipment transmits a maintenance request and the encrypted equipment information to the maintenance apparatus determined by the determination unit of the industrial equipment.

(82) The on-line diagnostics system according to (80), wherein the determination unit of the industrial equipment generates at least one maintenance apparatus candidate to which a maintenance request is to be transmitted, the input/output unit of the industrial equipment outputs the candidate(s) generated by the determination unit of the industrial equipment, wherein the determination unit of the industrial equipment determines the maintenance apparatus selected by the user of the industrial equipment from among the candidate(s) outputted by the input/output unit of the industrial equipment, as the maintenance apparatus to which the maintenance request is transmitted.

(83) The on-line diagnostics system according to (80), wherein the industrial equipment is semiconductor manufacture/inspection equipment.

(84) Industrial equipment remotely maintained by one or more maintenance apparatus connected via the Internet, comprising:

an encryption unit for encrypting equipment information indicating the state of the industrial equipment using a specific common key;

a determination unit for determining the maintenance apparatus to which the encrypted equipment information encrypted by the encryption unit is to be transmitted;

a communication unit for transmitting the encrypted equipment information encrypted by the encryption unit to the maintenance apparatus determined by the determination unit, and for transmitting the common key used in encrypting the encrypted equipment information in response to a request from the maintenance apparatus that received the encrypted equipment information, and an input/output unit for outputting all or part of the history of transmission of the common key from the industrial equipment to the maintenance apparatus.

(85) The industrial equipment according to (84), wherein the determination unit stores quality information indicating the quality of maintenance work that can be provided by each maintenance apparatus, determines one or more maintenance apparatus to which a maintenance request requesting maintenance is to be transmitted, based on the quality information received by the communication unit of the industrial equipment, wherein the communication unit transmits a maintenance request and the encrypted equipment information to the maintenance apparatus determined by the determination unit of the industrial equipment.

(86) The industrial equipment according to (84), wherein the determination unit generates at least one maintenance apparatus candidate to which a maintenance request is to be transmitted, the input/output unit of the industrial equipment outputs the candidate(s) generated by the determination unit, and the determination unit determines the maintenance apparatus selected by the user of the industrial equipment from among the candidate(s) outputted by the input/output unit as the maintenance apparatus to which a maintenance request is transmitted.

(87) An on-line diagnostics system comprising one or more pieces of industrial equipment for performing specific processes, a managing apparatus for managing information transmitted from the industrial equipment, and one or more maintenance apparatus for the maintenance of the industrial equipment, which are connected via the Internet, wherein the industrial equipment comprises a communication unit for transmitting equipment information indicating the state of the industrial equipment to the managing apparatus, the managing apparatus comprises an encryption unit for encrypting the equipment information transmitted by the communication unit of the industrial equipment, using a specific common key, a determination unit for determining the maintenance apparatus to which the encrypted equipment information encrypted by the encryption unit is to be transmitted, a communication unit for transmitting the encrypted equipment information encrypted by the encryption unit to the maintenance apparatus determined by the determination unit, and for transmitting the common key used in encrypting the encrypted equipment information in response to a request from the maintenance apparatus that received the encrypted equipment information, and an input/output unit for outputting all or part of the history of transmission of the common key from the managing apparatus to the maintenance apparatus, and the maintenance apparatus comprises a communication unit for receiving the encrypted equipment information transmitted by the communication unit of the managing apparatus, and for receiving the common key used in encrypting the encrypted equipment information from the managing apparatus after requesting it therefrom, a decryption unit for storing the common key received by the communication unit of the maintenance apparatus and for decrypting the encrypted equipment information using the stored common key, and an input/output unit for storing the equipment information decrypted by the decryption unit and for outputting all or part of the stored equipment information.

(88) The on-line diagnostics system according to (87), wherein the determination unit of the managing apparatus stores quality information indicating the quality of maintenance work that can be provided by each maintenance apparatus, and determines, based on the stored quality information, one or more maintenance apparatus to which a maintenance request requesting maintenance is to be transmitted, and wherein the communication unit of the managing apparatus transmits a maintenance request and the encrypted equipment information to the maintenance apparatus determined by the determination unit of the managing apparatus.

(89) The on-line diagnostics system according to (87), wherein the determination unit of the managing apparatus generates at least one maintenance apparatus candidate to which a maintenance request is to be transmitted, the input/output unit of the managing apparatus outputs the candidate(s) generated by the determination unit of the managing apparatus, and the determination unit of the managing apparatus determines the maintenance apparatus selected by the user of the managing apparatus from among the candidate(s) outputted by the input/output unit of the managing apparatus as the maintenance apparatus to which a maintenance request is transmitted.

(90) The on-line diagnostics system according to (87), wherein the industrial equipment is semiconductor manufacture/inspection equipment.

(91) A managing apparatus for managing information transmitted from one or more pieces of industrial equipment for performing specific processes, comprising:

an encryption unit for encrypting equipment information received from the industrial equipment using a specific common key;

a determination unit for determining a maintenance apparatus to which the encrypted equipment information encrypted by the encryption unit is to be transmitted;

a communication unit for transmitting the encrypted equipment information encrypted by the encryption unit to the maintenance apparatus determined by the determination unit, and for transmitting the common key used in encrypting the encrypted equipment information to the maintenance apparatus that received the encrypted equipment information, in response to a request therefrom; and an input/output unit for outputting all or part of the history of transmission of the common key from the communication unit to the maintenance apparatus.

(92) The managing apparatus according to (91), wherein the determination unit stores quality information indicating the quality of maintenance work that can be provided by each maintenance apparatus, and determines, based on the stored quality information, one or more maintenance apparatus to which a maintenance request requesting maintenance is to be transmitted, and wherein the communication unit transmits a maintenance request and the encrypted equipment information to the maintenance apparatus determined by the determination unit.

(93) The managing apparatus according to (91), wherein the determination unit generates at least one maintenance apparatus candidate to which a maintenance request is to be transmitted, the input/output unit outputs the candidate(s) generated by the determination unit of the managing apparatus, and the determination unit determines the maintenance apparatus selected by the user of the managing apparatus from among the candidate(s) outputted by the input/output unit as the maintenance apparatus to which a maintenance request is to be transmitted.

Thus, in accordance with the invention, equipment information stored in each piece of industrial equipment can be safely disclosed to maintenance personnel to the extent permitted by the user of the industrial equipment.

What is claimed is:

1. An on-line diagnostics system comprising one or more pieces of industrial equipment for performing specific processes, and a maintenance apparatus for maintaining the industrial equipment, which are connected via the Internet, wherein the industrial equipment comprises an encryption unit for encrypting equipment information indicating the state of the industrial equipment, using a specific common key; a communication unit for transmitting the encrypted equipment information encrypted by the encryption unit to the maintenance apparatus in response to a request therefrom, and transmitting the common key used in encrypting the equipment information to the maintenance apparatus that received the encrypted equipment information, in response to a request therefrom; and an input/output unit for outputting all or part of the history of transmission of the common key from the industrial equipment to the maintenance apparatus, the maintenance apparatus comprises: a communication unit for receiving the encrypted equipment information transmitted by the communication unit of the industrial equipment and for receiving the common key used in encrypting the equipment information from the industrial equipment after requesting it therefrom; a decryption unit for storing the common key received by the communication unit of the maintenance apparatus and for decrypting the encrypted equipment information using the stored common key; and an input/output unit for storing the equipment information decrypted by the decryption unit and for outputting all or part of the stored equipment information; and wherein the communication unit of the industrial equipment carries attribute information indicating the attributes of the user of the maintenance apparatus, and condition information indicating a condition concerning the attributes of the user of the maintenance apparatus that is required when transmitting the common key, wherein, when the common key is requested by the maintenance apparatus, the communication unit reads the attribute information about the user and the condition information about the common key, and transmits the common key to the maintenance apparatus only when the attributes in the attribute information that has been read satisfy the condition in the condition information that has been read.

2. The on-line diagnostics system according to claim 1, wherein the input/output unit of the industrial equipment outputs the encrypted equipment information to a memory medium, and wherein the input/output unit of the maintenance apparatus receives from the memory medium the encrypted equipment information outputted by the input/output unit of the industrial equipment.

3. The on-line diagnostics system according to claim 1, wherein the communication unit of the industrial equipment encrypts the common key using a public key associated with the maintenance apparatus before transmitting it, and wherein the communication unit of the maintenance apparatus decrypts the common key received from the communication unit of the industrial equipment, using a secret key associated with the public key.

4. The on-line diagnostics system according to claim 1, wherein the decryption unit of the maintenance apparatus stores rules limiting the operation on the common key received by the communication unit of the maintenance apparatus, and limits the operation on the common key received by the communication unit of the maintenance apparatus according to the stored rules.

5. The on-line diagnostics system according to claim 1, wherein the input/output unit of the maintenance apparatus stores rules limiting the operation on the equipment information decrypted by the decryption unit of the maintenance apparatus, and limits the operation on the equipment information decrypted by the decryption unit of the maintenance apparatus according to the stored rules.

6. The on-line diagnostics system according to claim 1, wherein the input/output unit of the maintenance apparatus outputs the stored equipment information using animation.

7. The on-line diagnostics system according to claim 1, wherein the input/output unit of the maintenance apparatus outputs the stored equipment information using a timing chart.

8. The on-line diagnostics system according to claim 1, wherein the input/output unit of the maintenance apparatus outputs a plurality of items of equipment data that has been stored to an output unit such that the items of equipment data are overlaid on a timing chart.

9. The on-line diagnostics system acceding according to claim 1, wherein the input/output unit of the maintenance apparatus generates event information indicating the contents of operation carried out by the user of the maintenance apparatus on the equipment information outputted by the input/output unit of the maintenance apparatus, the communication unit of the maintenance apparatus transmits the event information generated by the input/output unit of the maintenance apparatus to the industrial equipment that transmitted the common key, the communication unit of the industrial equipment receives the event information transmitted by the maintenance apparatus to which the common key has been transmitted, and the input/output unit of the industrial equipment outputs all or part of the event information received by the communication unit of the industrial equipment.

10. The on-line diagnostics system according to claim 9, wherein the input/output unit of the maintenance apparatus generates event information indicating that the cause of trouble has been identified by the user of the maintenance apparatus.

11. The on-line diagnostics system according to claim 10, wherein the input/output unit of the maintenance apparatus receives the grounds based on which the user of the maintenance apparatus has decided that a particular event is the cause of trouble, and stores the received grounds in the event information.

12. The on-line diagnostics system according to claim 10, wherein the input/output unit of the maintenance apparatus generates event information indicating that the common key stored in the decryption unit of the maintenance apparatus has been deleted by the user of the maintenance apparatus.

13. The on-line diagnostics system according to claim 10, wherein the input/output unit of the maintenance apparatus generates event information indicating that the equipment information stored in the input/output unit of the maintenance apparatus has been deleted by the user of the maintenance apparatus.

14. The on-line diagnostics system according to claim 9, wherein the communication unit of the maintenance apparatus stores event transmission rules for the transmission of the event information generated by the input/output unit of the maintenance apparatus to the industrial equipment, and limits the transmission of the event information generated by the input/output unit of the maintenance apparatus to the industrial equipment according to the stored rules.

15. The on-line diagnostics system according to claim 14, wherein the communication unit of the maintenance apparatus stores event transmission rules by which the event information indicating the identification of the cause of trouble by the user of the maintenance apparatus is transmitted to the industrial equipment that transmitted the common key.

16. The on-line diagnostics system according to claim 15, wherein the communication unit of the maintenance apparatus stores event transmission rules by which the event information indicating the grounds based on which a particular event has been determined to be the cause of trouble is transmitted to the industrial equipment that transmitted the common key.

17. The on-line diagnostics system according to claim 14, wherein the communication unit of the maintenance apparatus stores event transmission rules by which event information indicating that the common key stored in the decryption unit of the maintenance apparatus has been deleted by the user of the maintenance apparatus is transmitted to the industrial equipment that transmitted the common key.

18. The on-line diagnostics system according to claim 14, wherein the input/output unit of the maintenance apparatus stores event transmission rules by which event information indicating that the equipment information stored in the input/output unit of the maintenance apparatus has been deleted by the user of the maintenance apparatus is transmitted to the industrial equipment that transmitted the common key.

19. The on-line diagnostics system according to claim 1, wherein the maintenance apparatus comprises a registration unit for registering information identifying the industrial equipment, the encrypted equipment information used in identifying the cause of trouble, and a method of dealing with the trouble in a mutually related manner, and wherein the input/output unit of the maintenance apparatus outputs a method of dealing with a particular trouble by referring to the registration unit.

20. The on-line diagnostics system according to claim 1, wherein the industrial equipment is semiconductor manufacture/inspection equipment.

21. Industrial equipment adapted to be maintained remotely by a maintenance apparatus connected via the Internet, comprising: an encryption unit for encrypting equipment information indicating the state of the industrial equipment using a particular common key; a communication unit for transmitting the encrypted equipment information encrypted by the encryption unit to the maintenance apparatus in response to a request therefrom, and for transmitting the common key used in encrypting the equipment information in response to a request from the maintenance apparatus that received the encrypted equipment information; and an input/output unit for outputting all or part of the history of transmission of the common key from the industrial equipment to the maintenance apparatus; and wherein the communication unit carries attribute information indicating the attributes of a user of the maintenance apparatus, and condition information indicating a condition about the attributes of the user of the maintenance apparatus which is required in transmitting the common key, wherein, when the common key is requested by the maintenance apparatus, the communication unit reads the user's attribute information and the condition information about the common key and transmits the common key to the maintenance apparatus only when the condition in the condition information that has been read is satisfied by the attributes in the attribute information that has been read.

22. The industrial equipment according to claim 21, wherein the input/output unit outputs the encrypted equipment information to a memory medium before it is received by the maintenance apparatus.

23. The industrial equipment according to claim 21, wherein the communication unit encrypts the common key using a public key associated with the maintenance apparatus before transmitting it.

24. The industrial equipment according to claim 21, wherein the communication unit receives event information indicating the contents of operation performed by the user of the maintenance apparatus on the equipment information from the maintenance apparatus to which the common key has been transmitted, and wherein the input/output unit outputs all or part of the event information received by the communication unit.

25. The on-line diagnostics system according to claim 24, wherein the communication unit receives event information indicating that the cause of trouble has been identified by the user of the maintenance apparatus.

26. The on-line diagnostics system according to claim 25, wherein the communication unit receives event information indicating the grounds based on which the user of the maintenance apparatus has determined a particular event to be the cause of trouble.

27. The industrial equipment according to claim 24, wherein the communication unit receives event information indicating that the common key stored in the maintenance apparatus has been deleted by the user of the maintenance apparatus.

28. The industrial equipment according to claim 24, wherein the communication unit receives event information indicating that the equipment information stored in the maintenance apparatus has been deleted by the user of the maintenance apparatus.

29. An on-line diagnostics system comprising one or more pieces of industrial equipment for performing specific processes, a managing apparatus for managing information transmitted from the industrial equipment, and a maintenance apparatus for the maintenance of the industrial equipment, which are connected via the Internet, wherein the industrial equipment comprises a communication unit for transmitting equipment information indicating the state of the industrial equipment to the managing apparatus, the managing apparatus comprises an encryption unit for encrypting the equipment information transmitted from the industrial equipment, using a specific common key, a communication unit for transmitting the encrypted equipment information encrypted by the encryption unit to the maintenance apparatus in response to a request therefrom, and for transmitting the common key used in encrypting the encrypted equipment information in response to a request from the maintenance apparatus that received the encrypted equipment information, and an input/output unit for outputting all or part of the history of transmission of the common key from the managing apparatus to the maintenance apparatus, and the maintenance apparatus comprises a communication unit for receiving the encrypted equipment information transmitted by the communication unit of the managing apparatus, and for receiving the common key used in encrypting the encrypted equipment information from the managing apparatus after requesting it therefrom, a decryption unit for storing the common key received by the communication unit of the maintenance apparatus and for decrypting the encrypted equipment information using the stored common key, and an input/output unit for storing the equipment information decrypted by the decryption unit and for outputting all or part of the stored equipment information; and wherein the communication unit of the managing apparatus carries attribute information indicating the attributes of a user of the maintenance apparatus, and condition information indicating a condition concerning the attributes of the user of the maintenance apparatus which is necessary for the transmission of the common key, wherein, when the common key is requested by the maintenance apparatus, the communication unit reads the user's attribute information and the condition information about the common key, and transmits the common key to the maintenance apparatus only when the condition in the condition information that has been read is satisfied by the attributes in the attribute information that has been read.

30. The on-line diagnostics system according to claim 29, wherein the input/output unit of the managing apparatus outputs the encrypted equipment information to a memory medium, and the input/output unit of the maintenance apparatus receives from the memory medium the encrypted equipment information outputted by the input/output unit of the managing apparatus.

31. The one-line diagnostics system according to claim 29, wherein the communication unit of the managing apparatus encrypts the common key using a public key associated with the maintenance apparatus before transmitting it, and the communication unit of the maintenance apparatus decrypts the common key received from the communication unit of the industrial equipment, using a secret key associated with the public key.

32. The on-line diagnostics system according to claim 29, wherein the decryption unit of the maintenance apparatus stores rules limiting the operation on the common key received by the communication unit of the maintenance apparatus, and limits the operation on the common key received by the communication unit of the maintenance apparatus according to the stored rules.

33. The on-line diagnostics system according to claim 29, wherein the input/output unit of the maintenance apparatus stores rules limiting the operation on the equipment information decrypted by the decryption unit of the maintenance apparatus, and limits the operation on the equipment information decrypted by the decryption unit of the maintenance apparatus according to the stored rules.

34. The on-line diagnostics system according to claim 29, wherein the input/output unit of the maintenance apparatus outputs the stored equipment information using animation.

35. The on-line diagnostics system according to claim 29, wherein the input/output unit of the maintenance apparatus outputs the stored equipment information using a timing chart.

36. The on-line diagnostics system according to claim 29, wherein the input/output unit of the maintenance apparatus outputs a plurality of items of stored equipment data to the output unit such that they are overlaid on a timing chart.

37. The on-line diagnostics system according to claim 29, wherein the input/output unit of the maintenance apparatus generates event information indicating the contents of the operation performed by the user of the maintenance apparatus on the equipment information outputted by the input/output unit of the maintenance apparatus, the communication unit of the maintenance apparatus transmits the event information generated by the input/output unit of the maintenance apparatus to the managing apparatus that transmitted the common key, and the communication unit of the managing apparatus receives the event information transmitted by the maintenance apparatus to which the common key has been transmitted, and the input/output unit of the managing apparatus outputs all or part of the event information received by the communication unit of the managing apparatus.

38. The on-line diagnostics system according to claim 37, wherein the input/output unit of the maintenance apparatus generates event information indicating that the cause of trouble has been identified by the user of the maintenance apparatus.

39. The on-line diagnostics system according to claim 38, wherein the input/output unit of the maintenance apparatus receives the grounds based on which the user of the maintenance apparatus has determined a particular event to be the cause of trouble, and stores the received grounds in the event information.

40. The on-line diagnostics system according to claim 37, wherein the input/output unit of the maintenance apparatus generates event information indicating that the common key stored in the decryption unit of the maintenance apparatus has been deleted by the user of the maintenance apparatus.

41. The on-line diagnostics system according to claim 37, wherein the input/output unit of the maintenance apparatus generates event information indicating that the equipment information stored in the input/output unit of the maintenance apparatus has been deleted by the user of the maintenance apparatus.

42. The on-line diagnostics system according to claim 29, wherein the communication unit of the maintenance apparatus stores rules regarding the transmission of the event information generated by the input/output unit of the maintenance apparatus to the managing apparatus, and transmits the event information generated by the input/output unit of the maintenance apparatus to the managing apparatus in accordance with the stored rules.

43. The on-line diagnostics system according to claim 42, wherein the communication unit of the maintenance apparatus stores event transmission rules regarding the transmission of event information indicating that the cause of trouble has been identified by the user of the maintenance apparatus to the managing apparatus that transmitted the common key.

44. The on-line diagnostics system according to claim 42, wherein the communication unit of the maintenance apparatus stores event transmission rules regarding the transmission of event information indicating the grounds based on which a particular event has been determined to be the cause of trouble to the managing apparatus that transmitted the common key.

45. The on-line diagnostics system according to claim 42, wherein the communication unit of the maintenance apparatus stores event transmission rules regarding the transmission of event information indicating that the common key stored in the decryption unit of the maintenance apparatus has been deleted by the user of the maintenance apparatus to the managing apparatus that transmitted the common key.

46. The on-line diagnostics system according to claim 42, wherein the input/output unit of the maintenance apparatus stores event transmission rules regarding the transmission of event information indicating that the equipment information stored in the input/output unit of the maintenance apparatus has been deleted by the user of the maintenance apparatus to the managing apparatus that transmitted the common key.

47. The on-line diagnostics system according to claim 29, wherein the maintenance apparatus comprises a registration unit for registering information identifying the industrial equipment, the encrypted equipment information used in identifying the cause of trouble, and a method of dealing with trouble in a mutually related manner, and wherein the input/output unit of the maintenance apparatus outputs a method of dealing with trouble by referring to the registration unit.

48. The on-line diagnostics system according to claim 29, wherein the industrial equipment is semiconductor manufacture/inspection equipment.

49. A managing apparatus for managing information transmitted from one or more pieces of industrial equipment for performing specific processes, comprising: an encryption unit for encrypting equipment information indicating the state of the industrial equipment using a specific common key; a communication unit for transmitting the encrypted equipment information encrypted by the encryption unit to a maintenance apparatus connected via the Internet in response to a request therefrom, and for transmitting the common key used in encrypting the encrypted equipment information in response to a request from the maintenance apparatus that received the encrypted equipment information; and an input/output unit for outputting all or part of the history of transmission of the common key to the maintenance apparatus; and wherein the communication unit carries attribute information indicating the attributes of a user of the maintenance apparatus, and condition information indicating a condition concerning the attributes of the user of the maintenance apparatus which is necessary for the transmission of the common key, wherein, when the common key is requested by the maintenance apparatus, the communication unit reads the attribute information about the user of the maintenance apparatus and the condition information about the common key, and transmits the common key to the maintenance apparatus only when the condition in the condition information that has been read is satisfied by the attributes in the attribute information that has been read.

50. The managing apparatus according to claim 49, wherein the input/output unit outputs to a memory medium the encrypted equipment information to be received by the maintenance apparatus.

51. The managing apparatus according to claim 49, wherein the communication unit encrypts the common key using a public key associated with the maintenance apparatus before transmitting it.

52. The managing apparatus according to claim 49, wherein the communication unit receives event information from the maintenance apparatus to which the common key has been transmitted, the event information indicating the contents of operation performed by the user of the maintenance apparatus on the equipment information, and the input/output unit outputs all or part of the event information received by the communication unit.

53. The managing apparatus according to claim 52, wherein the communication unit receives event information indicating that the cause of trouble has been identified by the user of the maintenance apparatus.

54. The managing apparatus according to claim 52, wherein the communication unit receives event information indicating the grounds based on which the user of the maintenance apparatus has determined a particular event to be the cause of trouble.

55. The managing apparatus according to claim 52, wherein the communication unit receives event information indicating that the common key stored in the maintenance apparatus has been deleted by the user of the maintenance apparatus.

56. The managing apparatus according to claim 52, wherein the communication unit receives event information indicating that the equipment information stored in the maintenance apparatus has been deleted by the user of the maintenance apparatus.

57. An on-line diagnostics system comprising one or more pieces of industrial equipment for performing specific processes, and one or more maintenance apparatus for the maintenance of the industrial equipment, which are connected via the Internet, wherein: the industrial equipment comprises an encryption unit for encrypting equipment information indicating the state of the industrial equipment using a specific common key, a determination unit for determining a maintenance apparatus to which the encrypted equipment information encrypted by the encryption unit is to be transmitted, a communication unit for transmitting the encrypted equipment information encrypted by the encryption unit to the maintenance apparatus determined by the determination unit, and for transmitting the common key used in encrypting the encrypted equipment information in response to a request from the maintenance apparatus that received the encrypted equipment information, and an input/output unit for outputting all or part of the history of transmission of the common key from the industrial equipment to the maintenance apparatus, and wherein the maintenance apparatus comprises a communication unit for receiving the encrypted equipment information transmitted by the communication unit of the industrial equipment, and for receiving the common key used in encrypting the encrypted equipment information from the industrial equipment after requesting it therefrom, a decryption unit for storing the common key received by the communication unit of the maintenance apparatus and for decrypting the encrypted equipment information using the stored common key, and an input/output unit for storing the equipment information decrypted by the decryption unit and for outputting all or part of the stored equipment information; and wherein the determination unit of the industrial equipment stores quality information indicating the quality of maintenance work that can be provided by each maintenance apparatus, and determines one or more maintenance apparatus to which a maintenance request requesting maintenance is to be transmitted, based on the stored quality information, and wherein the communication unit of the industrial equipment transmits a maintenance request and the encrypted equipment information to the maintenance apparatus determined by the determination unit of the industrial equipment.

58. The on-line diagnostics system according to claim 57, wherein the determination unit of the industrial equipment generates at least one maintenance apparatus candidate to which a maintenance request is to be transmitted, the input/output unit of the industrial equipment outputs the candidate(s) generated by the determination unit of the industrial equipment, wherein the determination unit of the industrial equipment determines the maintenance apparatus selected by the user of the industrial equipment from among the candidate(s) outputted by the input/output unit of the industrial equipment, as the maintenance apparatus to which the maintenance request is transmitted.

59. The on-line diagnostics system according to claim 57, wherein the industrial equipment is semiconductor manufacture/inspection equipment.

60. Industrial equipment remotely maintained by one or more maintenance apparatus connected via the Internet, comprising: an encryption unit for encrypting equipment information indicating the state of the industrial equipment using a specific common key; a determination unit for determining the maintenance apparatus to which the encrypted equipment information encrypted by the encryption unit is to be transmitted; a communication unit for transmitting the encrypted equipment information encrypted by the encryption unit to the maintenance apparatus determined by the determination unit, and for transmitting the common key used in encrypting the encrypted equipment information in response to a request from the maintenance apparatus that received the encrypted equipment information, and an input/output unit for outputting all or part of the history of transmission of the common key from the industrial equipment to the maintenance apparatus; and wherein the determination unit stores quality information indicating the quality of maintenance work that can be provided by each maintenance apparatus, determines one or more maintenance apparatus to which a maintenance request requesting maintenance is to be transmitted, based on the quality information received by the communication unit of the industrial equipment, wherein the communication unit transmits a maintenance request and the encrypted equipment information to the maintenance apparatus determined by the determination unit of the industrial equipment.

61. The industrial equipment according to claim 60, wherein the determination unit generates at least one maintenance apparatus candidate to which a maintenance request is to be transmitted, the input/output unit of the industrial equipment outputs the candidate(s) generated by the determination unit, and the determination unit determines the maintenance apparatus selected by the user of the industrial equipment from among the candidate(s) outputted by the input/output unit as the maintenance apparatus to which a maintenance request is transmitted.

62. An on-line diagnostics system comprising one or more pieces of industrial equipment for performing specific processes, a managing apparatus for managing information transmitted from the industrial equipment, and one or more maintenance apparatus for the maintenance of the industrial equipment, which are connected via the Internet, wherein the industrial equipment comprises a communication unit for transmitting equipment information indicating the state of the industrial equipment to the managing apparatus, the managing apparatus comprises an encryption unit for encrypting the equipment information transmitted by the communication unit of the industrial equipment, using a specific common key, a determination unit for determining the maintenance apparatus to which the encrypted equipment information encrypted by the encryption unit is to be transmitted, a communication unit for transmitting the encrypted equipment information encrypted by the encryption unit to the maintenance apparatus determined by the determination unit, and for transmitting the common key used in encrypting the encrypted equipment information in response to a request from the maintenance apparatus that received the encrypted equipment information, and an input/output unit for outputting all or part of the history of transmission of the common key from the managing apparatus to the maintenance apparatus, and the maintenance apparatus comprises a communication unit for receiving the encrypted equipment information transmitted by the communication unit of the managing apparatus, and for receiving the common key used in encrypting the encrypted equipment information from the managing apparatus after requesting it therefrom, a decryption unit for storing the common key received by the communication unit of the maintenance apparatus and for decrypting the encrypted equipment information using the stored common key, and an input/output unit for storing the equipment information decrypted by the decryption unit and for outputting all or part of the stored equipment information; and wherein the determination unit of the managing apparatus stores quality information indicating the quality of maintenance work that can be provided by each maintenance apparatus, and determines, based on the stored quality information, one or more maintenance apparatus to which a maintenance request requesting maintenance is to be transmitted, and wherein the communication unit of the managing apparatus transmits a maintenance request and the encrypted equipment information to the maintenance apparatus determined by the determination unit of the managing apparatus.

63. The on-line diagnostics system according to claim 62, wherein the determination unit of the managing apparatus generates at least one maintenance apparatus candidate to which a maintenance request is to be transmitted, the input/output unit of the managing apparatus outputs the candidate(s) generated by the determination unit of the managing apparatus, and the determination unit of the managing apparatus determines the maintenance apparatus selected by the user of the managing apparatus from among the candidate(s) outputted by the input/output unit of the managing apparatus as the maintenance apparatus to which a maintenance request is transmitted.

64. The on-line diagnostics system according to claim 62, wherein the industrial equipment is semiconductor manufacture/inspection equipment.

65. A managing apparatus for managing information transmitted from one or more pieces of industrial equipment for performing specific processes, comprising: an encryption unit for encrypting equipment information received from the industrial equipment using a specific common key; a determination unit for determining a maintenance apparatus to which the encrypted equipment information encrypted by the encryption unit is to be transmitted; a communication unit for transmitting the encrypted equipment information encrypted by the encryption unit to the maintenance apparatus determined by the determination unit, and for transmitting the common key used in encrypting the encrypted equipment information to the maintenance apparatus that received the encrypted equipment information, in response to a request therefrom; and an input/output unit for outputting all or part of the history of transmission of the common key from the communication unit to the maintenance apparatus; and wherein the determination unit stores quality information indicating the quality of maintenance work that can be provided by each maintenance apparatus, and determines, based on the stored quality information, one or more maintenance apparatus to which a maintenance request requesting maintenance is to be transmitted, and wherein the communication unit transmits a maintenance request and the encrypted equipment information to the maintenance apparatus determined by the determination unit.

66. The managing apparatus according to claim 65, wherein the determination unit generates at least one maintenance apparatus candidate to which a maintenance request is to be transmitted, the input/output unit outputs the candidate(s) generated by the determination unit of the managing apparatus, and the determination unit determines the maintenance apparatus selected by the user of the managing apparatus from among the candidate(s) outputted by the input/output unit as the maintenance apparatus to which a maintenance request is to be transmitted.

* * * * *